US011397833B2

(12) United States Patent
Lapushkin et al.

(10) Patent No.: US 11,397,833 B2
(45) Date of Patent: Jul. 26, 2022

(54) SYSTEM AND METHOD FOR ANONYMOUSLY COLLECTING MALWARE RELATED DATA FROM CLIENT DEVICES

(71) Applicant: AO Kaspersky Lab, Moscow (RU)

(72) Inventors: Anton S. Lapushkin, Moscow (RU);
Dmitry V. Shmoylov, Moscow (RU);
Andrey V. Ladikov, Moscow (RU);
Andrey A. Efremov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 202 days.

(21) Appl. No.: 17/024,791

(22) Filed: Sep. 18, 2020

(65) Prior Publication Data

US 2021/0004488 A1    Jan. 7, 2021

Related U.S. Application Data

(63) Continuation-in-part of application No. 16/547,114, filed on Aug. 21, 2019, now Pat. No. 11,297,166.

(30) Foreign Application Priority Data

Mar. 29, 2019    (RU) .......................... RU2019109171

(51) Int. Cl.
*G06F 21/62*    (2013.01)
*G06F 16/25*    (2019.01)
*G06F 21/60*    (2013.01)
*G06F 21/56*    (2013.01)
*H04L 9/40*    (2022.01)

(52) U.S. Cl.
CPC ........ *G06F 21/6254* (2013.01); *G06F 16/258* (2019.01); *G06F 21/602* (2013.01); *H04L 63/145* (2013.01)

(58) Field of Classification Search
CPC .............. H04L 63/145; H04L 63/0421; H04L 63/0442; G06F 16/258; G06F 21/6254; G06F 21/602; G06F 21/567
See application file for complete search history.

(56) References Cited

U.S. PATENT DOCUMENTS

| 8,601,598 B2 | 12/2013 | Ozzie et al. |
| 8,739,265 B2 | 5/2014 | Ang et al. |
| 9,294,486 B1 * | 3/2016 | Chiang .................. G06F 21/55 |
| 2014/0101774 A1 | 4/2014 | Armington et al. |

(Continued)

*Primary Examiner* — Fatoumata Traore
*Assistant Examiner* — Hamid Talaminaei
(74) *Attorney, Agent, or Firm* — ArentFox Schiff LLP; Michael Fainberg

(57) ABSTRACT

Systems and methods for anonymous collection of malware-related data from client devices. The system comprising a network node configured to (i) receive a first data structure from a client device, wherein the first data structure contain an identifier of the client device and an encrypted data that includes an identifier of a user of the client device and/or personal data of the user, and wherein the encrypted data was encrypted by the client device with a public key of the client device, wherein the public key was provided to the client device by an independent certification authority, (ii) transform the received first data structure by replacing the identifier of the client device with an anonymized identifier, and (iii) transmit the transformed first data structure containing the anonymized identifier and the encrypted data to a server.

15 Claims, 23 Drawing Sheets

(56) References Cited

U.S. PATENT DOCUMENTS

| | | |
|---|---|---|
| 2014/0122866 A1 | 5/2014 | Haeger et al. |
| 2015/0006895 A1* | 1/2015 | Irvine ................. G06F 21/6218 713/171 |
| 2016/0134595 A1 | 5/2016 | Lavinio |
| 2017/0243028 A1 | 8/2017 | Lafever et al. |
| 2019/0332807 A1* | 10/2019 | LaFever ............. H04L 63/0407 |

* cited by examiner

| | Rule hypothesis (if) | | | | | Rule disposition (then) | | | | | |
|---|---|---|---|---|---|---|---|---|---|---|---|
| | Type | | Input | | | Output | | | | | |
| | | | Source/recipient | | | Routing | | Transformation | | | |
| | | | | | | Method | Node with anonymization module in regional network | PD | | | |
| № | Request | Statistics | Client | Server | PD | 1 | 2 | 3 | | Encryption | Tokenization | Encryption of non-PD |
| 1 | + | | USA | RF | | + | + | | USA | | + | + |
| 2 | | + | USA | RF | | + | | + | Germany | | + | |
| 3 | | + | Germany | RF | | + | + | | Germany | | + | + |
| 4 | + | | Germany | RF | | + | | + | USA | | + | |

Fig. 15

SYSTEM AND METHOD FOR ANONYMOUSLY COLLECTING MALWARE RELATED DATA FROM CLIENT DEVICES

CROSS-REFERENCE TO RELATED APPLICATIONS

The present application is a Continuation-in-Part of and claims priority to patent application Ser. No. 16/547,114 filed Aug. 21, 2019, which in turn claims priority to a Russian Application No. 2019109171 filed on Mar. 29, 2019, all of which are incorporated by reference herein.

FIELD OF TECHNOLOGY

The present disclosure relates generally to the field of information security, and more specifically, to systems and methods for anonymously collecting malware-related data from client devices.

BACKGROUND

Changes in legislation around the world are forcing information security specialists to seek out new methods for managing data coming from personal electronic devices. For example, in the Russia Federation a law was signed whereby the personally identifiable information of Russians used by Internet services must be kept on the territory of Russia; in Switzerland, banks are also required not to allow user data to leave the juridical territory of the federal government; and in a number of countries, personally identifiable information is prohibited from being kept in open form. The solutions being developed should not make the work of the users of computer systems more difficult and they should be as transparent as possible to the users in their operation.

With the advent of the General Data Protection Regulation (GDPR), the quantity of personal data being kept in a network infrastructure on the part of various services and being received from users is trending toward a minimum. It is necessary to provide distributed storage and processing of data obtained from users without losing its uniqueness.

These principles are causing difficulties in the adopting of a cloud infrastructure in the corporate and private sector. A solution is needed that will be able to solve these difficulties.

SUMMARY

The technical result of the present disclosure is to enable secure and anonymous collection of malware-related data from client devices at a server.

In one aspect, a method for anonymously collecting malware-related data from client devices comprises: receiving, by a network node, a first data structure from a client device, wherein the first data structure contain an identifier of the client device and an encrypted data that includes an identifier of a user of the client device and/or personal data of the user, and wherein the encrypted data was encrypted by the client device with a public key of the client device, wherein the public key was provided to the client device by an independent certification authority; transforming, by the network node, the received first data structure by replacing the identifier of the client device with an anonymized identifier, and transmitting the transformed first data structure containing the anonymized identifier and the encrypted data to a server; receiving, by the server, the transformed first data structure from the network node; receiving, by the server, a second data structure from the client device, wherein the second data structure contains malware-related data obtained on the client device; and combining, by the server, the transformed first data structure with the second data structure and storing the combined data structure at the server, whereby the server cannot access and/or view (i) the identifier of the client device and (ii) the identifier of the user of the client device and/or personal data of the user stored in the combined data structure.

In one aspect, the anonymized identifier includes an encrypted identifier of the client device.

In one aspect, the client device is located in a first regional network, the network node is located in a second regional network different from the first regional network, and the server is located in a third regional network different from the first and second regional networks.

In one aspect, the first regional network and the third regional network are located in different legal jurisdictions.

In one aspect, the malware-related data includes a hash of a malicious file.

In one aspect, the network node is not located in a same intranet as the server and the client device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6b—illustrates an exemplary aspect of the method of data routing in a client-server architecture upon detecting a targeted attack on the client based on information gathered by the method of FIG. 6a.

FIG. 15—illustrates a table of example rules for a moderation module according to aspects of the present disclosure.

DETAILED DESCRIPTION

Exemplary aspects are described herein in the context of a system, method, and computer program product for anonymous collection of malware-related data from client devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
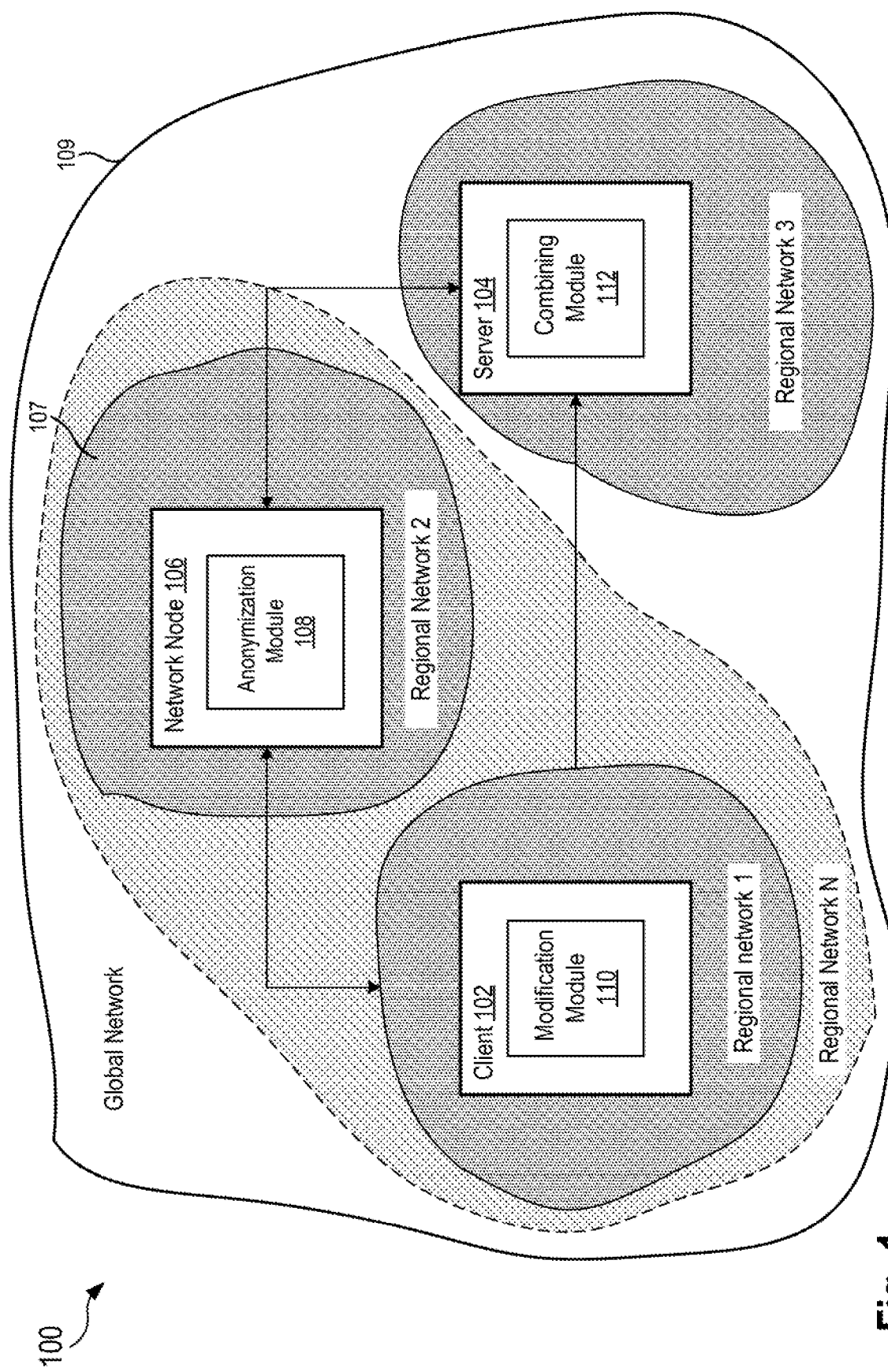
FIG. 1—illustrates a system for data routing in a client-server architecture.

FIG. 1 illustrates a system 100 for data routing in a client-server architecture. The system 100 includes a client 102, a server 104, and a network node 106 with an anonymization module 108. The server 104 may be part of a cloud infrastructure (not shown in the figure), while the client may be a user's device. The node 106 with the anonymization module 108 may be situated in a regional network 107 different from the regional network in which the server is situated (i.e., regional-network-2 and regional-network-3), and is not located in the same intranet as the server 104 or the client 102. As used herein, a regional network 107 refers to a geographically dispersed network, bringing together computers at different points into a whole by communication means, the set of regional networks forming a global network 109. In the context of the present disclosure, different regional networks 107 are not only geographically separated, but also are located in different jurisdictions (i.e., possibly subject to different regulations), so that in the context of the present disclosure the different regional networks may also include networks bringing together the nodes of countries (national networks). For example, in FIG. 1, the Regional Network "1" is the network of the United States of America, the Regional Network "2" is the network of Germany and/or the European Union, and Regional Network "3" is the network of the Russian Federation.

The global network 109 of FIG. 1 is the totality of all the regional networks 107, or the world network, the Internet. In the terminology of the GDPR, for example, the regional network of the RF in which the server is situated will be considered to be a regional network of a third party.

In a particular instance, the regional network 107 of the node 106 with the anonymization module 108 is also different from the regional network of the client 102. The arrows in FIG. 1 are depicted as originating from a network, and not from the client, since in the general case the external IP address is visible thanks to the use of internal address hiding technologies, particularly Proxy, NAT (Network Address Translation).

The client 102 may include a modification module 110 configured to divide one or more data structures (e.g., which are created for dispatching data from the client to the server) into substructures and to select a route for the obtained substructures. A data structure is a collection of data values generated and maintained by components of the system 100, including the client 102 and the server 104. It is noted that some of the data values in the data structure may be "personal data", and therefore subject to data privacy policies and regulations. A substructure then is a type of data structure that contains a subset of the data values from the original data structure. By way of example, the data values in the data structure may include data submissions, user requests, data queries and/or query results, log data, state data of an application, records of user transaction(s), user-generated content, and other forms of data suitable for exchange in a client-server architecture. In some examples, a data structure may be in-memory data structures (e.g., linked lists, hash tables, trees, arrays, database records), or on-disk data structures (e.g., files, blobs). In other examples, a data structure may be one or more network data packet(s) configured for the transmission of the data values contained herein from the client to the server. The data structure may be serialized, in text format, in a structured format (e.g., Extendible Markup Language or XML, JavaScript Object Notation or JSON), or other format for information exchange.

There may be various criteria for the division of a data structure into substructures. One such criterion may be the presence of personal data (Personal Identification Information) or special categories thereof (in the terminology of the GDPR), whereby the data structure is divided up such that one substructure contains the personal data (hereinafter, PD, or PII) or special categories thereof, another substructure includes data which is not personal data (i.e., the other substructure does not contain PD). The characterization and assignment of data as personal data can be dictated, for example, by the laws of the country in the jurisdiction of which the user of the device being the client in the system being described is situated, in other words, according to the location of the data source.

Another criterion for the division of a data structure into substructures is the presence of critical data. Critical data is data on which the law or an authorized entity imposes restrictions on its gathering, storage, accessing, dissemination, and processing. Critical data is generally sensitive with regard to divulgence, dissemination, and leakage, since the occurrence of these events will lead to a violation of the rights and the lawfully protected interests of users, as protected by law, and liability is enforced against those who commit infractions of the rules for gathering, storing, accessing, and processing of such data. A particular case of critical data is confidential data (sensitive data) or personal data. Confidential data refers to data which is protected in accordance with the regulations of the country in the jurisdiction of which the user of the device which is the client in the system being described is located. Confidential data in a particular case includes personal data (PD) and data containing commercial secrecy, tax secrecy, banking secrecy, medical secrecy, notarial secrecy, attorney secrecy, audit secrecy, communications secrecy, insurance secrecy, last testament secrecy, adoption secrecy, confessional secrecy, investigational secrecy, court proceedings secrecy, information on protected persons, and state secrecy. In one aspect, the critical data may include sensitive personal data, as specified under the GDPR, which is any data that reveals racial or ethnic origin, political opinions, religious or philosophical beliefs, trade union membership, data concerning health or sex life and sexual orientation, and genetic data or biometric data (e.g., for the purpose of uniquely identifying a natural person).

The anonymization module 108 is configured to perform a transformation and the inverse transformation of the substructures whose route passes through the node 106 with the anonymization module 108. In one aspect, a transformation of substructures may be a transformation of the data contained in the substructure. In a particular instance, the methods of transformation of the data of the substructures may include one or more of quantization, sorting, merging (pasting), grouping, data set configuration, table substitution of values, calculated values, data encoding, encryption, and normalization (scaling).

Certain kinds of transformation may be applied not only to individual data in the substructure, but also to the substructure as a whole, for example tokenization and/or encryption. In a particular instance, the transformation is carried out with no possibility of an inverse transformation by any means other than the anonymization module 108 of the node. An inverse transformation refers to a transformation which restores the original form of an object of transformation (data, a substructure) prior to the transformation. Generally, a transformation may be any mapping (function) of a set onto itself, or in other words, transformations are mappings which translate a certain set into another set.

A substructure from the same client may be transformed by the anonymization module 108 by the same method or by different methods. If the transformation is carried out by the same method, then the transformed substructure or the data of the substructure from the same client will have an identical appearance; otherwise, they will differ and it will not be possible to construct statistics for the same client (perform a profiling).

The server 104 may include a combining module 112, which is configured to combine a data structure that was divided at the client side. The combining module 112 may combine data, for example, on the basis of unique identifiers, which are assigned to each substructure during the division and are identical for the substructures of the same structure. The combining module 112 receives substructures arriving at the server 104 by various network routes and combines them into a structure. The structure will clearly be different from the original one, divided at the client side, because the substructures passing through the node with the anonymization module 108 will be transformed by that module 108. The resulting structure may be saved in a database (not shown in the figures).

In a particular instance, the anonymization module 108 obtains from the client a structure not divided into substructures by the modification module 110 of the client (for example, the structure of a request for the server), in which case the anonymization module 108 for the transmission to the server identifies in the obtained structure the substructures containing PD and performs a transformation of the data of the substructures; examples are given below.

The described system 100 is used for the anonymization of requests being dispatched to the server 104 and responses to these requests being dispatched to the client 102, and also for obtaining data from clients 102 which is used for the construction of statistics.

Figure 2:
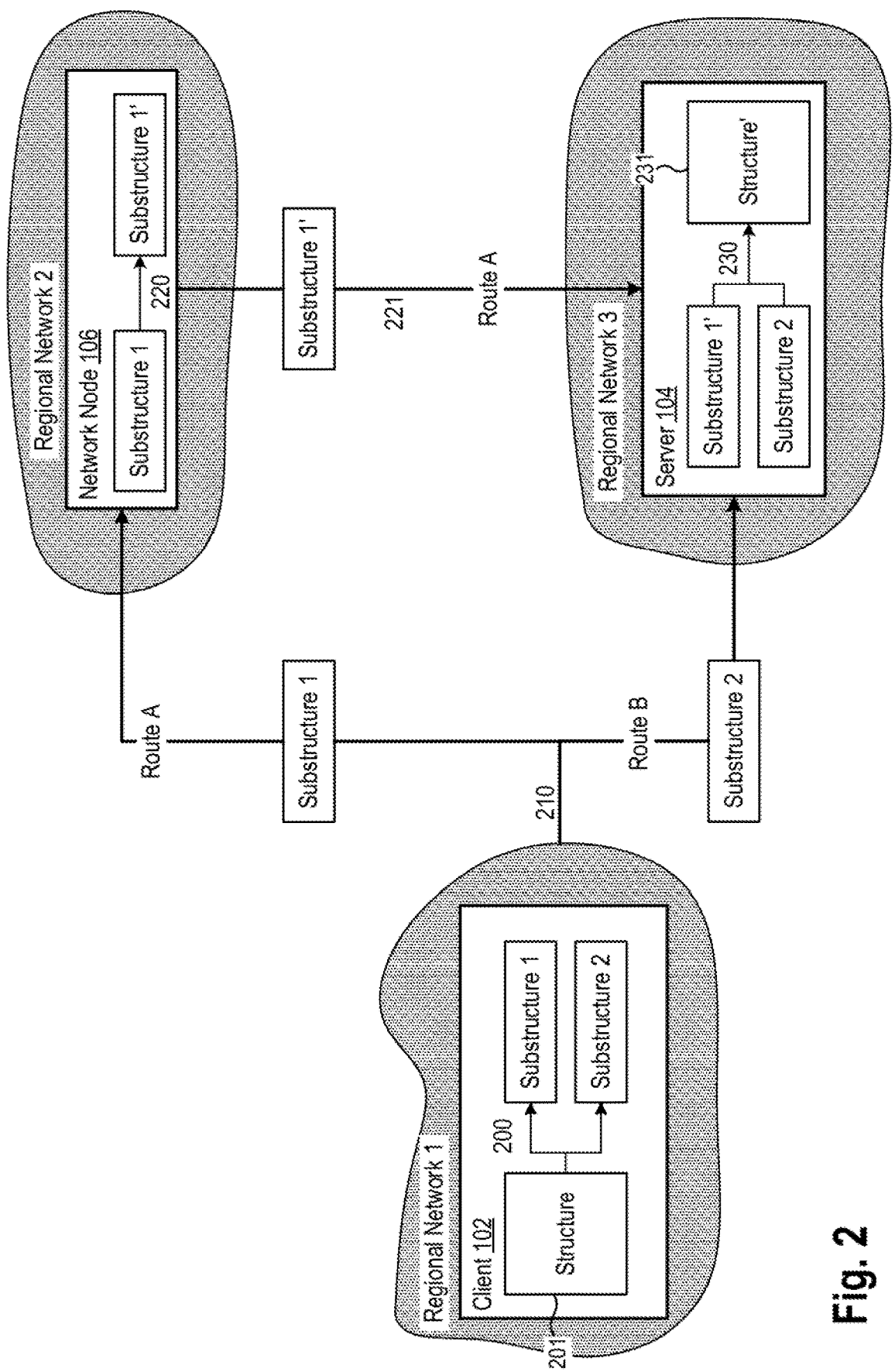
FIG. 2—illustrates a variant of a method of data routing in a client-server architecture with the data structure being divided into substructures by the client.

FIG. 2 is a block diagram showing exemplary operations according to a method of routing data in a client-server architecture, which is used in a particular instance for obtaining data from clients for the construction of statistics. In step 200 the modification module 110 (e.g., executing on the client 102) divides the structure 201 intended for dispatch to the server in accordance with criteria, one such criterion possibly being the presence of PD in the structure, and as a result of the division there is obtained a substructure containing PD (in FIG. 2 this is substructure 1, for example) and one not containing PD (in FIG. 2 this corresponds to substructure 2). Here and below, as an example of the criterion we shall use the presence of PD, and not the presence of personal or confidential data, even though what is valid for PD is also valid for personal or confidential data in general in the example aspect of the present disclosure in the context of the present application. In a particular instance, there may be more than one substructure of the first and second type, as well as more than one criterion by which the division is performed.

In step 210 the modification module 110 dispatches (i.e., transmits) the obtained substructures to the server 104, the dispatching occurring by various routes (route A and route B), where one of the routes (e.g., Route A) includes the network node 106 with the anonymization module 108. In an aspect, the modification module 110 may determine at least two routes for dispatching the at least two data substructures based on personal data contained in the one of the data substructures. The network node 106 is situated in a regional network different from the network where the server 104 is located and not in the same intranet as the server or the client 102. When one of the substructures intended for dispatch to the server contains PD, the substructures will be directed to the server via the node with the anonymization module 108 (route A).

Then, in step 220, the substructures passing through the node 106 with the anonymization module 108 are transformed by that module 108 and then sent to the server 104 (step 221) in a transformed state. In the general case, the substructures from the same client are transformed differently at different moments in time. For example, a substructure having a client identifier sent at a first time period is transformed to include an anonymized identifier (AnonymizedID1) which is different a subsequent anonymized identifier (AnonymizedID2) from a substructure sent at a second time even if it came from the same client and had the same client identifier (i.e., Client ID→AnonymizedID1≠AnonymizedID2≠AnonymizedID3 and so on), and this may pertain to all the examples. In a particular case, when it is necessary, for certain security systems, to assemble information (construct statistics) on a particular client, the transformation will be identical for a substructure from the same client (for example, Client ID→AnonymizedID1=AnonymizedID2=AnonymizedID3 and so on).

In conclusion, in step 230 the substructures obtained from the client are combined into a structure 231 (Structure'). Clearly, the resulting structure (Structure') is different from the original one, since at least one substructure has been transformed by the anonymization module 108. The resulting structure 231 will also be used in the database by the infrastructure at the server side. The infrastructure and database are omitted from the figure for clarity of illustration. Individual infrastructure elements such as a request processor 302 and an attack detection module 602 are indicated in other figures. The transformation of the substructures and/or data of the substructures by the anonymization module 108 is conducted in such a way as to exclude the possibility of an inverse transformation of the substructures and/or data of the substructures by any means other than the means of the network node 106 with the anonymization module 108.

Figure 3:
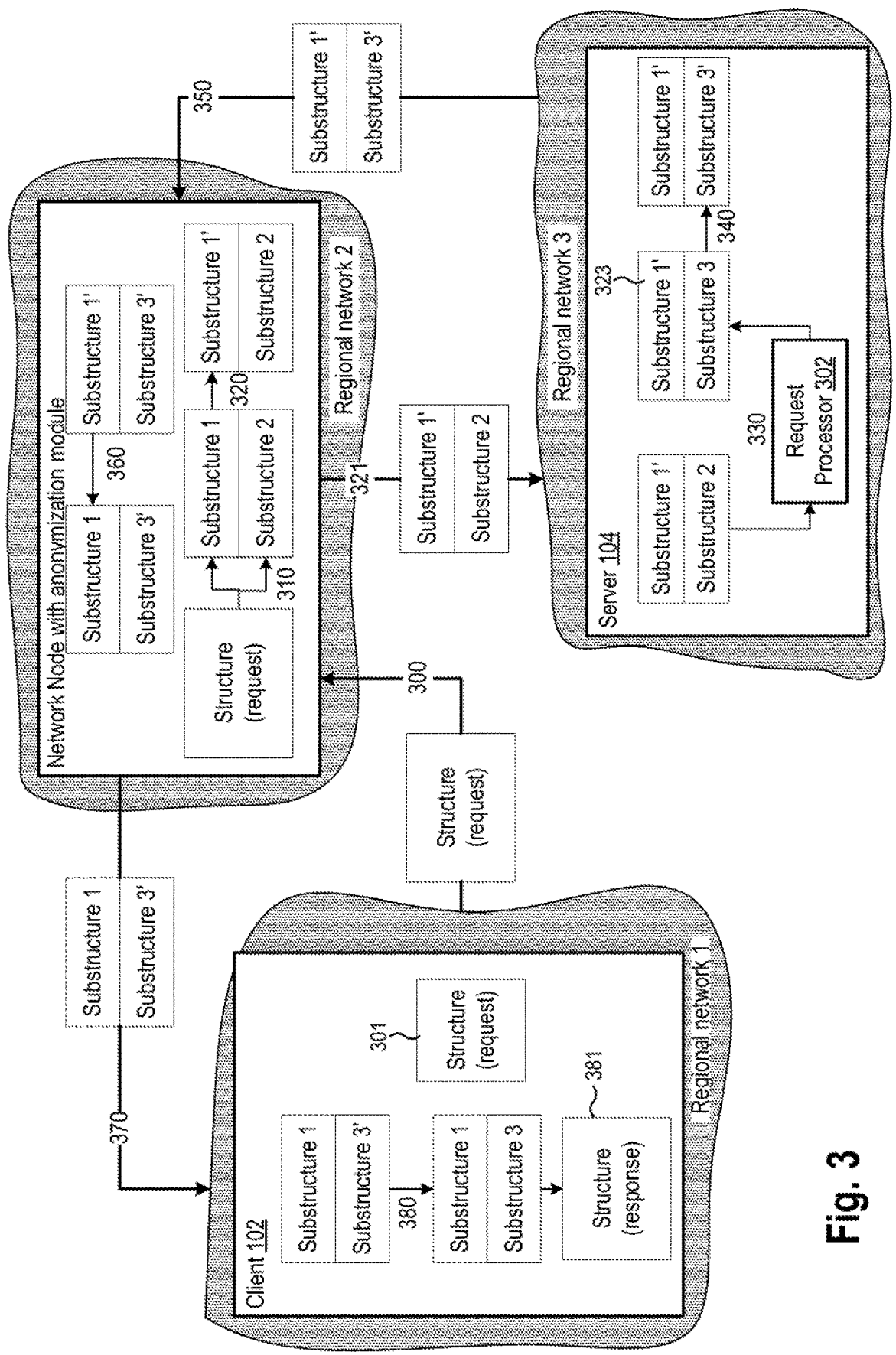
FIG. 3—illustrates a variant of the method of data routing in a client-server architecture when executing a request with identification of substructures in the data structure by an anonymization module.

FIG. 3 shows a routing method which is used, in a particular instance, for executing a request 301 of the client in relation to the server. In step 300 the request generated at the client side is dispatched by the modification module 110 from the client 102 to the server 104, the route including the network node 106 with the anonymization module 108, said node being situated in a regional network different from the network where the server is located and not being in the same intranet with the server or the client. In a particular instance, some of the request data (not containing confidential data) may be transformed by the modification module 110 at the client side, and the transformation may be carried out such that it is impossible for the anonymization module 108 to perform the inverse transformation (step 311 in FIG. 4) and only the server 104 can perform the inverse transformation (step 325 in FIG. 4). By way of example, the transformation and inverse transformation may be performed using asymmetrical encryption techniques, where the client 102 has a public key and the server 104 has a private key. As used herein, unless otherwise indicated, the term "transformation" refers to a forward transformation.

Next, in step 310, the anonymization module 108 identifies substructures in the data structure of the request intended for dispatches to the server in accordance with criteria, one such criterion possibly being the presence of PD, and obtaining as a result of the identification a substructure containing PD (in FIG. 3, by analogy with the previous example, this is Substructure 1) and one not containing PD (in FIG. 3 this is Substructure 2). In step 320, the anonymization module 108 is used to perform a transformation (a forward transformation from original to transformed) of the data substructure (and/or the data in the substructure) containing PD, and the anonymization module 108 is used to dispatch the resulting data structure of the request with the transformed substructure containing PD to the server (step 321).

In response to the request received, the server in step 330 generates a response 323 using a request processor 302. In regards to the data of the request which may have been transformed by the client 102 in a particular instance, the server 104 first performs an inverse transformation (step 325 in FIG. 4, as described later). The data structure 323 of the response to the request, in the example with PD, will contain substructures: (1) at least one substructure(s) containing PD transformed by the anonymization module 108 (Substructure 1', extracted from the request structure); and at least one substructure(s) not containing PD (substructure 3, containing the body of the response to the request or the payload of the response).

The data not containing PD (substructure 3) may be transformed (forward transformation) without the possibility of an inverse transformation by the anonymization module 108 (Substructure 3'), this being done in step 340. The inverse transformation of this data may only be performed by the modification module 110 of the client (e.g., asymmetrical encryption in which the server has a public key and the client a private key), in step 350 the resulting data structure 324 of the response to the request is dispatched from the server to the network node with the anonymization module 108. The anonymization module 108 in step 360 is used to perform the inverse transformation of the data substructures of the response 324 to the request containing PD (substructure 1'). The inverse transformation is done with respect to the data which was transformed in step 320 (inverse transformation from transformed data to original data contained initially in the request from the client). The obtained data structure is redirected to the client (step 370) and the modification module 110 of the client in step 380 is used to perform the inverse transformation of the data substructures of the response to the request not containing PD that were transformed by the server in step 340. As a result, the client 102 generates a data structure 381 containing data substructures of the response to the request not containing PD transformed by the server.

Figure 4:
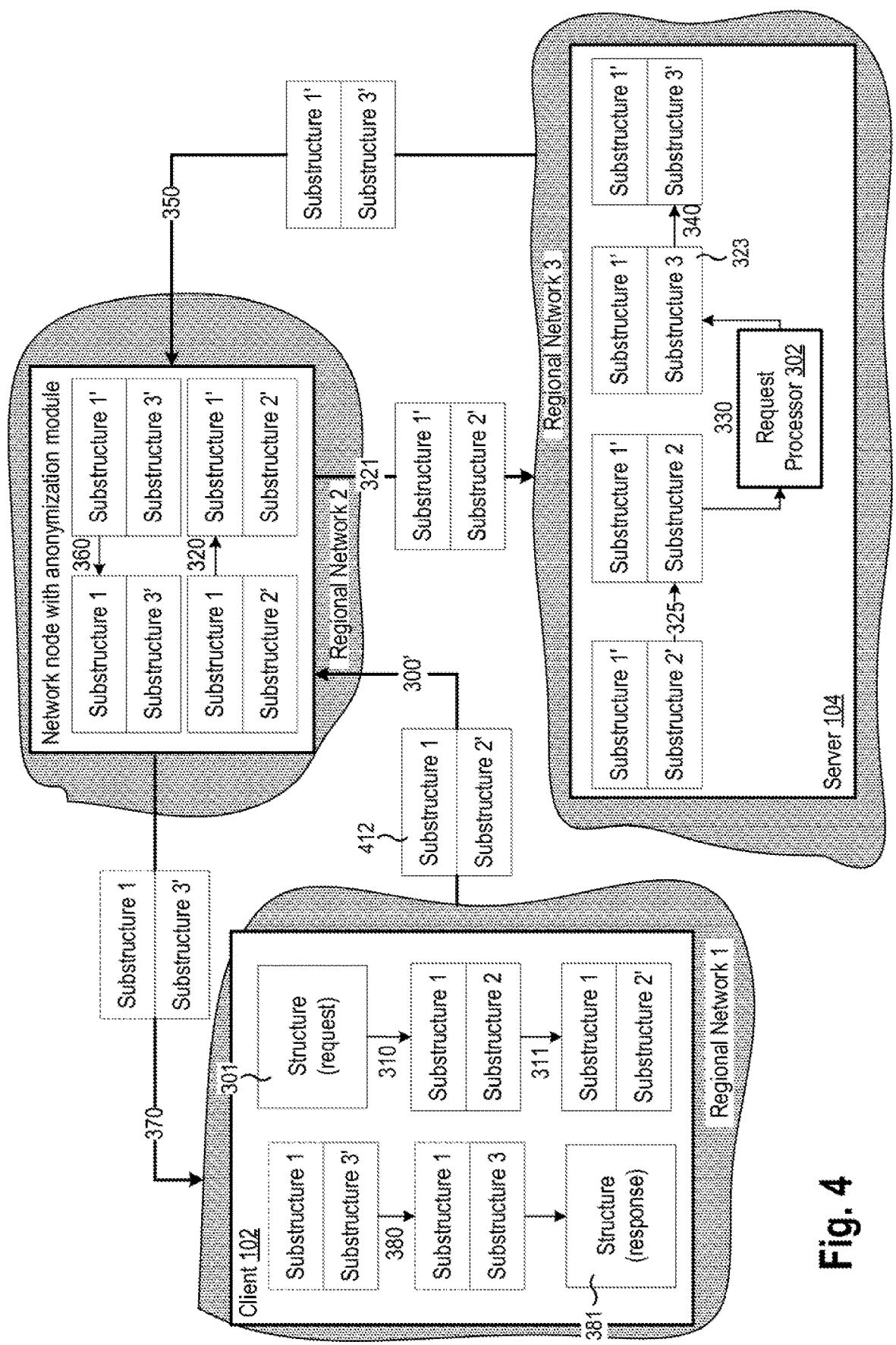
FIG. 4—illustrates a variant of the method of data routing in a client-server architecture with identification of substructures in the data structure by the client.

FIG. 4 shows a variant of the method shown in FIG. 3, but in this variant step 310 for identifying the substructures is performed not by the anonymization module 108, but by the modification module 110 of the client, followed by transformation of the substructure in step 311. By analogy with the variant in FIG. 3, the substructure not containing PD (substructure 2) is subjected to the transformation. Therefore, step 300' in FIG. 4 differs from the analogous step 300 of the method in FIG. 3 in that it is not the original data structure of the request which is sent to the node with the anonymization module 108, but rather the transformed structure 412 after performing steps 310 and 311. Accordingly, in this variant, step 325 is added, where there is performed at first an inverse transformation of the substructure (in the example, Substructure 2', not containing PD) that was transformed in step 311, before performing step 330.

Figure 5:
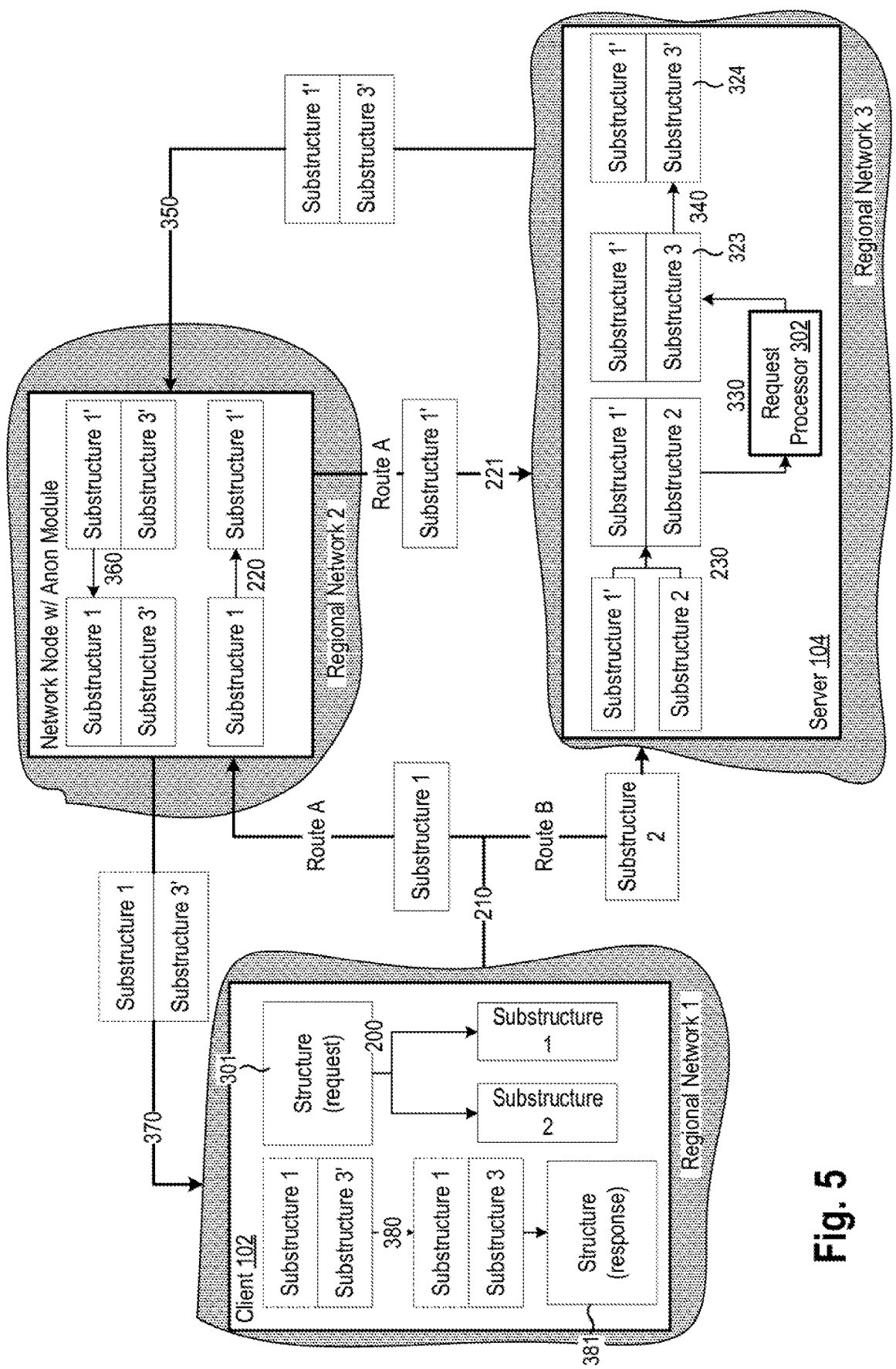
FIG. 5—illustrates a variant of the method of data routing in a client-server architecture when executing a request with division of the data structure into substructures by the client.

FIG. 5 shows a variant of the method of data routing in a client-server architecture in which steps 200 to 230 are analogous to the steps of the method shown in FIG. 2, while steps 300 to 380 are analogous to the steps of the method shown in FIG. 3. In a particular case, the Substructure 2 before being dispatched directly to the server may first be transformed, by analogy with step 311 in FIG. 4, and then step 325 is added in the diagram of the method, besides step 311.

In a particular instance, in all aspects of the method shown in FIG. 3-FIG. 5 the data structure dispatched to the client 102 by the node 106 with the anonymization module 108 in step 370 does not contain a data substructure with PD (in the examples, Substructure 1). That substructure needs to be saved until this step, in order to determine the addressee of the response; after this, there is no need for it in the particular instance.

Figure 6A:
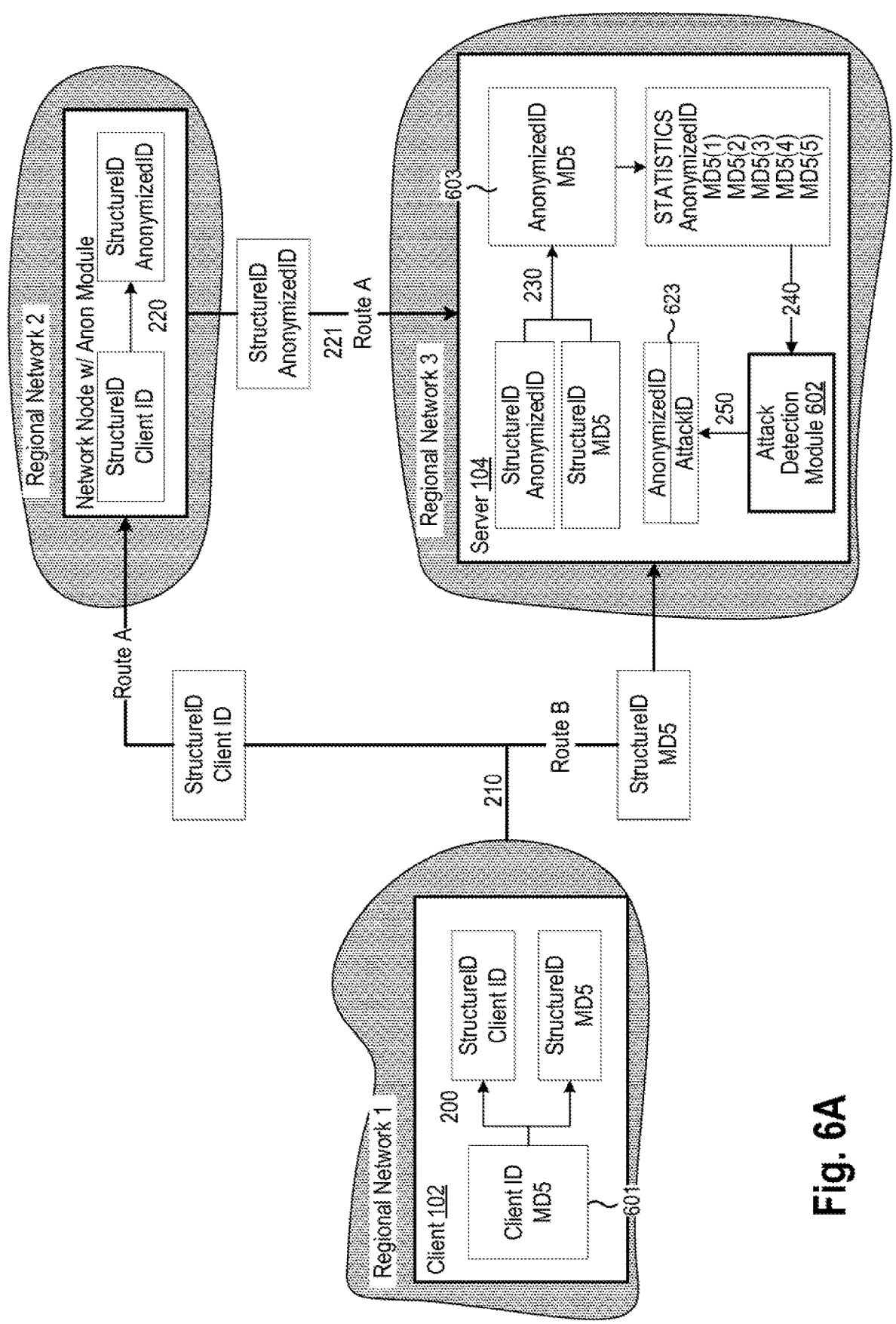
FIG. 6a—illustrates an exemplary aspect of the method of data routing in a client-server architecture when sending data (for the construction of statistics) with division of the data structure into substructures by the client.

FIG. 6a shows exemplary operations of the method shown in FIG. 2. The client 102 is communicatively connected to a system for remote detection of targeted attacks, such as an attack detection module 602, located on the server side. To permit full operation of the attack detection module 602, it may be necessary to obtain information from the client 102 as to files with malicious code (malicious files) detected at various times and to construct statistics on the basis of the information obtained (often, in compliance with the national legislation on personal data this still needs to be done anonymously). Upon detecting several such malicious files based on information received from the client, a conclusion is made at the server side that a targeted attack has been detected on the client.

For the transmission of information to the server pertaining to the malicious file detected, the client 102 generates a data structure 601 which includes a client identifier ("clientID") and information pertaining to the malicious file detected ("MD5") of the malicious file detected. In step 200 the modification module 110 divides the generated structure 601 intended for dispatch to the server into substructures, obtaining as a result of the division a substructure containing the Client ID and a substructure containing the MD5 of the file. In order to know which structure the substructures pertain, they are assigned an identifier (in the figure the identifier is denoted as StructureID). In step 210 the modification module 110 of the client transmits the obtained substructures to the server 104, the transmission occurring by different routes (route A and route B), where one of the routes (route A) includes a network node 106 with the anonymization module 108, said node 106 being situated in a regional network different from the network where the server is located, and not being in the same intranet as the server or the client. The substructure containing the Client ID is directed to the server 104 across the node 106 with the anonymization module 108 (route A). In step 220 the anonymization module 108 performs the transformation of the client ID, where the client ID is saved at the node, and replaces it in the substructure with the token AnonymizedID (in a particular instance, the client ID may be encrypted). The obtained substructure is dispatched to the server (step 221). In conclusion, in step 230 the substructures received from the client are combined into a structure 603. Clearly, the resulting structure 603 differs from the original one (601), since at least one substructure was transformed by the anonymization module 108. The resulting structure 603 is saved at the server 104 (or in any given database of the infrastructure to which the server belongs) and will be used by the server to assemble information (denoted in the figure as STATISTICS) on the client 102 from whom the structure was obtained. In step 240 the assembled information will be used by the attack detection module 602 and if the attack detection module 602 detects an attack then in step 250 the attack detection module 602 generates a data structure 623 containing a substructure with the AnonymizedID and a substructure containing information on the attack (denoted in the figure as AttackID); the obtained structure 623 will be addressed to the client to give notice of the attack.

Figure 6B:
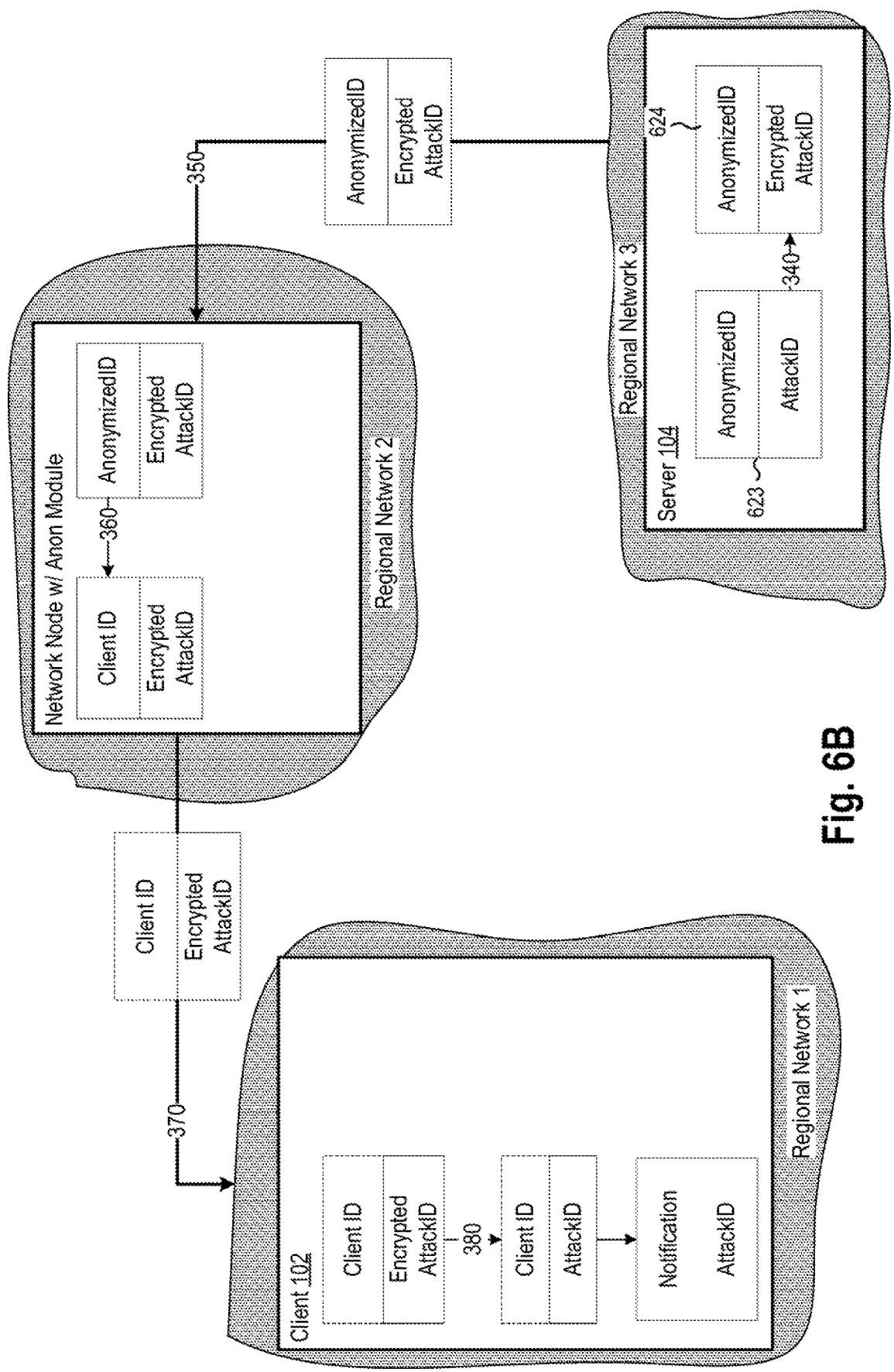
Figure 8:
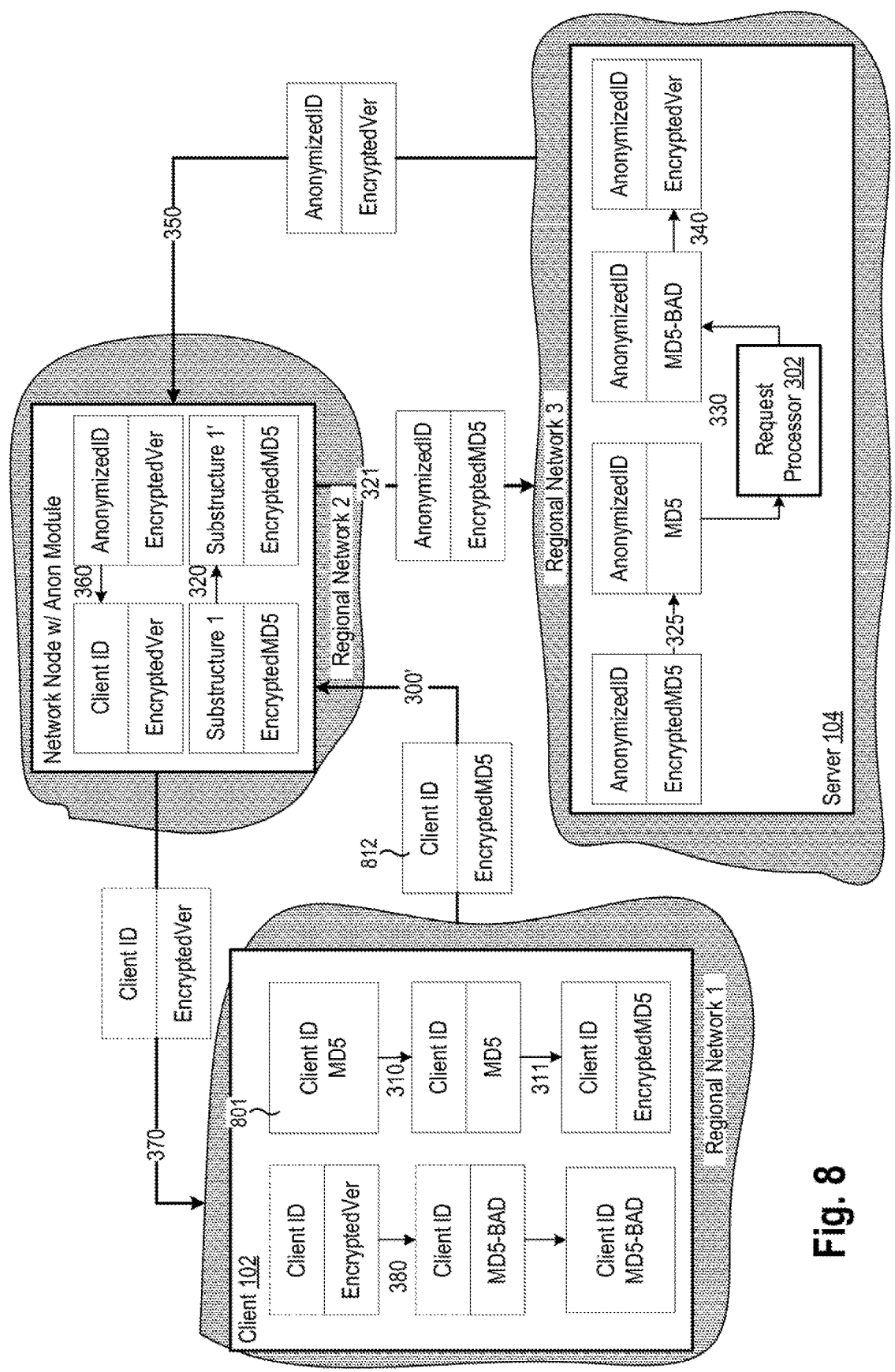
FIG. 8—illustrates an aspect of the method of data routing in a client-server architecture with identification of substructures in the data structure by the client.

An example of the method of dispatching is shown in FIG. 6b, steps 340 to 380 being analogous to the steps of the example shown in FIG. 8. In a particular instance, information about the attack might not be transformed, but rather be dispatched in open form; in that case, the example will lack the steps 340 and 380. In the aspects shown in FIG. 6b as well as in the other Figures of the present disclosure, optional and alternative aspects are depicted in dashed outline or in a light, italicized font style, such as the clientID field in the obtained response in step 370.

Figure 7:
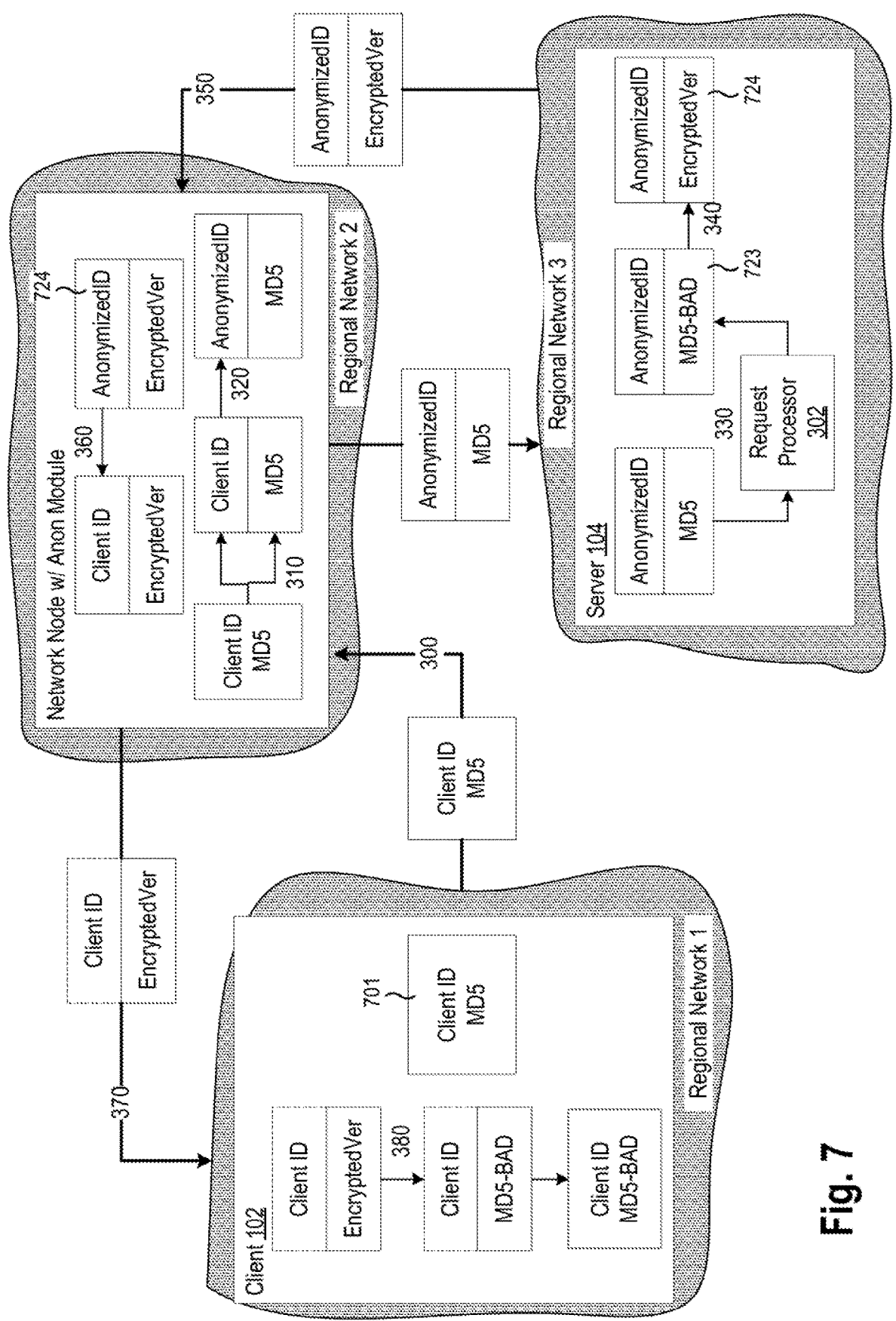
FIG. 7—illustrates an aspect of the method of data routing in a client-server architecture when executing a request with identification of substructures in the data structure by the anonymization module.

FIG. 7 shows another example operation of the present disclosure. The client device 102 has detected a new file, which needs to be scanned for the presence of malicious code by the server 104. For this, it is necessary to dispatch information about the file to the server, in the present example this being the file's MD5, for which the client generates a request data structure 701. For this purpose, in order to tell the server to whom the response should be dispatched, the modification module 110 (e.g., executing at the client 102) inserts in the request data structure 701 a client ID, such that the request data structure 701 includes the client ID and the file MD5. In step 300 the generated request is dispatched by the modification module 110 to the server, the route including the network node 106 with the anonymization module 108, said node being situated in a regional network different from the network where the server is located, and not being in the same intranet as the server or the client. Next, in step 310, the anonymization module 108 identifies substructures in the structure 701 intended for dispatch to the server, obtaining as a result of the identification a substructure containing the client ID and a substructure containing the file's MD5. In step 320, the anonymization module 108 performs a transformation of the client ID, where the client ID is saved at the node 106, and this is replaced in the substructure by the token AnonymizedID (in a particular instance, the client ID may be encrypted). The obtained data structure of the request with the transformed substructure is dispatched to the server (step 321). A response 723 to the request received is generated in step 330 by the request processor 302 of the server 104. The request processor 302 extracts from the structure the file MD5 and issues a verdict indicating that the file under analysis at the client is malicious, for example, "MD5-BAD". The data structure 723 of the response to the request contains the following substructures: (1) at least one substructure containing the token AnonymizedID (or the client ID encrypted by the anonymization module 108); and (2) at least one substructure containing a verdict for the file (MD5-BAD).

In this regard, the verdict in step 340 is transformed by the server 104 without possibility of an inverse transformation by the anonymization module 108, for example by encrypting it with a public key (the transformed verdict is denoted in the figure as EncryptedVer), the private key is kept at the client, and the inverse transformation may only be performed by the modification module 110 of the client. In step 350 the obtained data structure 724 of the response to the request is dispatched from the server to the network node 106 with the anonymization module 108. The anonymization module 108 in step 360 performs the inverse transformation of the data substructure of the response 724 to the request containing the token AnonymizedID by the anonymization module 108, where in the case of a token the token is replaced by the previously saved client ID, and in the case where the client ID was encrypted it is then decrypted. Thus, the transformation is performed with regard to the data which was transformed in step 320. The obtained data structure is redirected to the client (step 370) and the modification module 110 of the client in step 380 performs the inverse transformation of the verdict transformed by the server in step 340; in the example, it is decrypted with the aid of the private key. In a particular instance, AnonymizedID is for the same client ID, but they will be different in different transmissions.

FIG. 8 shows a variant of the example shown in FIG. 7. In this variant the step 310 after identification of the substructures is performed not by the anonymization module 108, but by the modification module 110 of the client 102 with later transformation of the substructure saving information about the file (the MD5 of the file) by encryption with the public key (in the figure the transformed information about the file is denoted as EncryptedMD5); the private key is kept at the server and the inverse transformation may be performed only at the server. Thus, step 300' of the example in FIG. 8 differs from the analogous step of the example in FIG. 7 in that it is not the original structure of the request (e.g., 801) which is sent to the node with the anonymization module 108, but rather the transformed one (data structure 812), after performing steps 310 and 311. Accordingly, therefore, step 325 is added, where prior to performing step 330 an inverse transformation is done for the encrypted information about the file by decrypting it with the aid of the private key.

Figure 9:
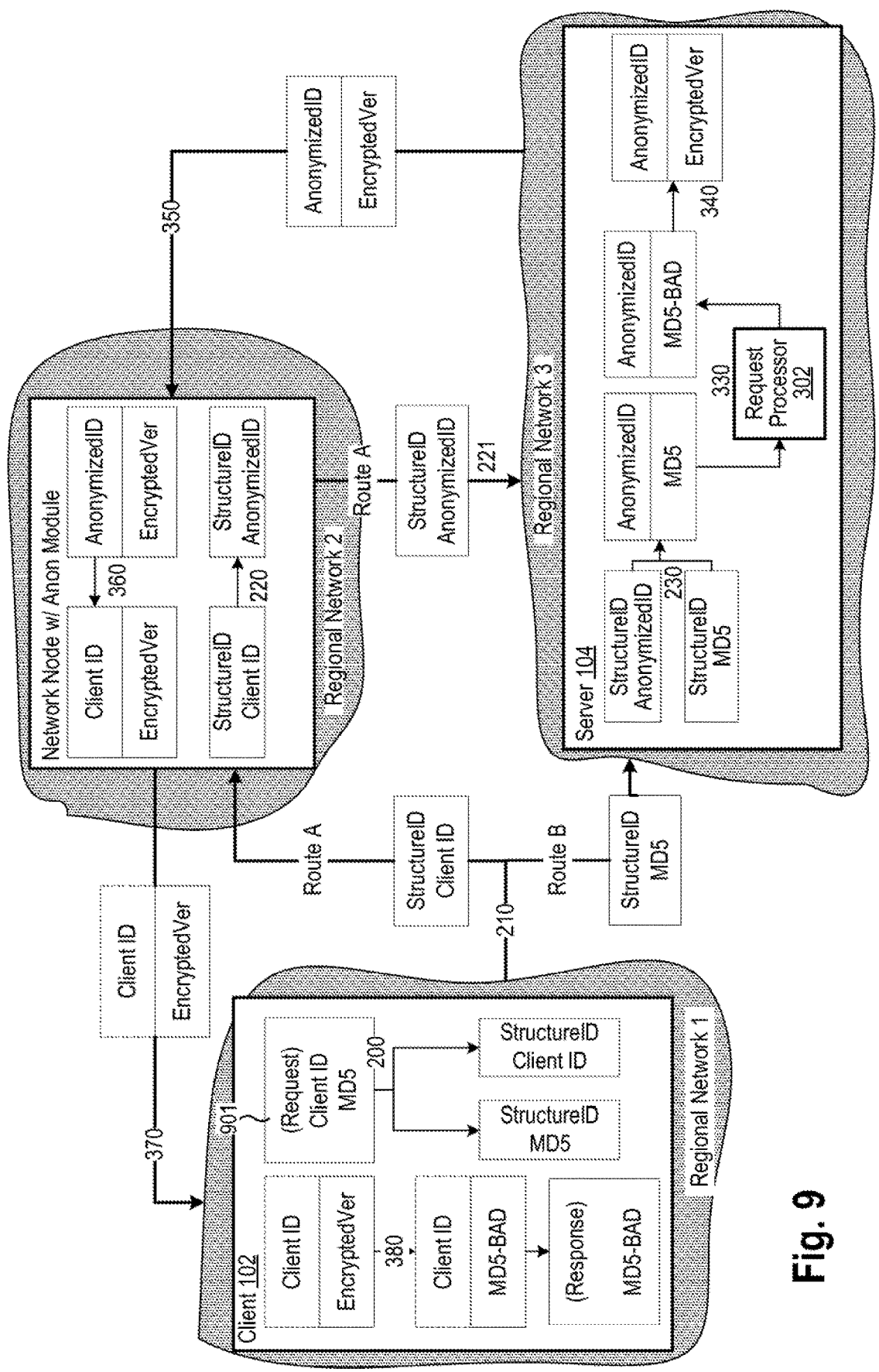
FIG. 9—illustrates an aspect of the method of data routing in a client-server architecture when executing a request with division of the data structure into substructures by the client.

FIG. 9 shows an example of data routing in a client-server architecture in which steps 200 to 230 are analogous to the steps of the example shown in FIG. 6a, while steps 330 to 380 are analogous to the steps of the example shown in FIG. 7. In a particular instance, the information about the file may first be transformed prior to being dispatched directly to the server, by analogy with step 311 in the example of FIG. 8, so that step 325 is added in the example, besides step 311.

The modification module 110 of the client intercepts the structures 901 intended for dispatch to the server, divides these structures in accordance with established rules, and selects routes for these substructures also in accordance with rules. The rules by which the modification module 110 functions are established in a particular instance according to one or more information technology policies configured to comply with the existing regulations and legislation in the jurisdiction of which the client device 102 (the source) is operating. Therefore, in order to apply the rules the modification module 110 of the client determines the location of the device (source), the type of data in the formed data structure 901, the purpose of the data structure (e.g., the type of transmission: request or statistics, where dispatching of data to the server for compilation of statistics at the server side), the location of the data recipient. On this basis in accordance with the rules the modification module 110 selects the route for the data, the division variant, and the method of transformation at the client side. One variant of formalized rules is presented in Table 1 seen in FIG. 15, where the "Method" column indicates the correlated method for transforming can include the following approaches: "Method 1" is characterized as including the division of a data structure at the client side (see 2); "Method 2" is characterized as including the identification of the data structure at the node with the anonymization module 108 (see FIG. 3); "Method 3" is characterized as including the identification of the data structure at the client side (see FIG. 4).

As indicated above, the rules may be dictated by the requirements of regulations/legislation (such as the GDPR) and just as any given legal norm includes a hypothesis and a disposition, so too in algorithmic language there is a corresponding if—then construction. Thus, the provided Table 1 formalizes a rule in the following format:

IF [type, source, recipient, personal data (yes/no)], THEN [method, location of anonymization node, method of transformation for the data]

Listing 1: Example Rule Format

Consider an example data structure, in which the modification module 110 determines that: the type of transmission is a request, the source (client) is Germany, the recipient (server) is the Russian Federation, and the structure contains personal data. In accordance with the rules, the modification module 110 identifies the substructure with PD at the client side (as in step 310 of FIG. 4—method 2) and dispatches it via the USA, encrypts the substructure without PD by the public key (as in step 311 of FIG. 4), and transforms the personally identifiable information by the anonymization module 108 by encryption.

Figure 10:
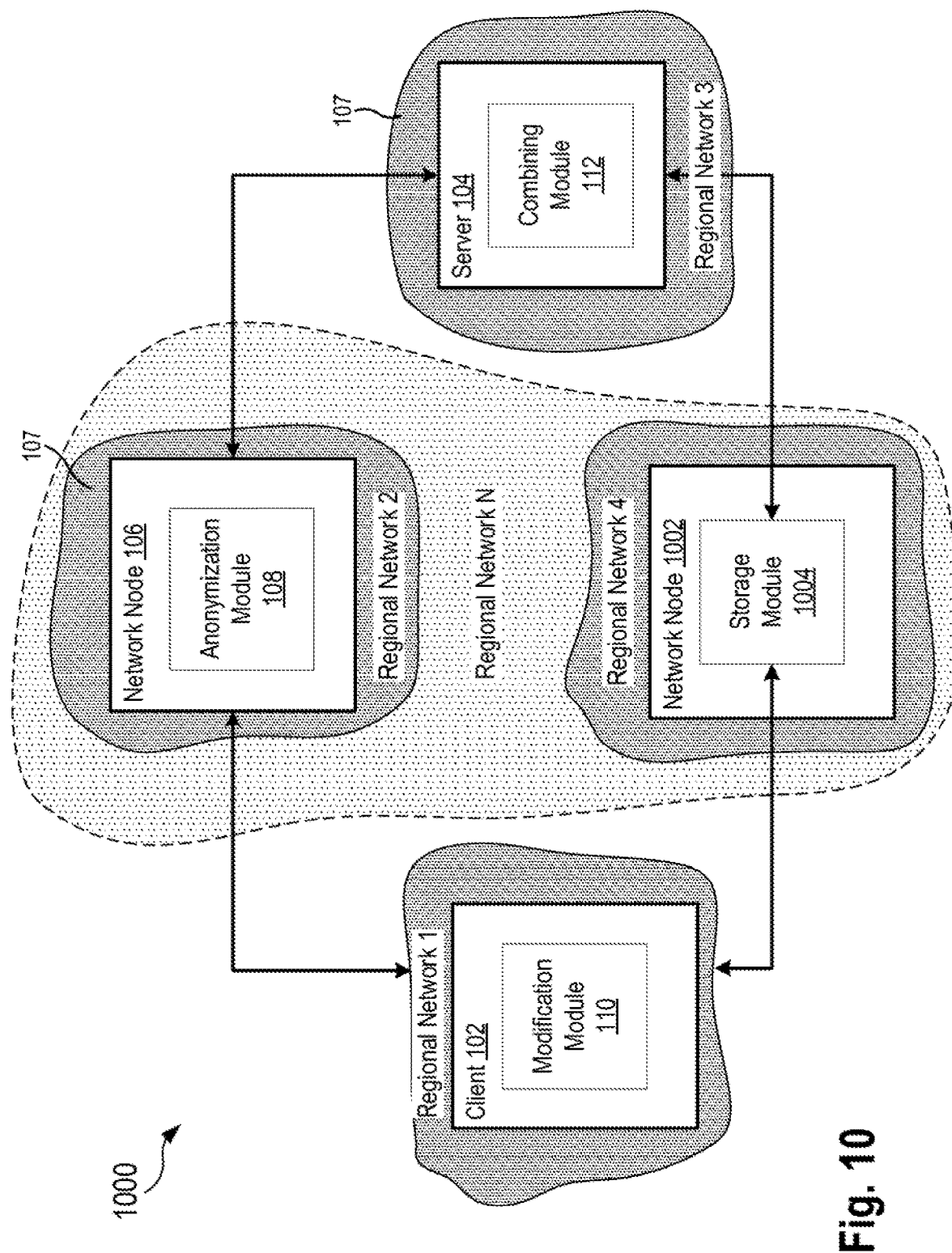
FIG. 10—illustrates a system of anonymous data exchange in a client-server architecture.

FIG. 10 illustrates a variant system 1000 of anonymous data exchange in a client-server architecture, similar to the system shown in FIG. 1, except the system 1000 includes a network node 1002 with a storage module 1004. The storage module 1004 may include one or more storage devices. The network node 1002 with the storage module 1004 is situated in a regional network 107 different from the regional network in which the server is located and is not in the same intranet as the server or the client. In a particular instance, the network node 1002 with the storage module 1004 may be in the same regional network as the network node 106 with the anonymization module 108; such as the network in FIG. 10 indicated as "Regional Network N". The purpose of the network node 1002 with storage module 1004 is to hide the external IP address of the client 102 from the server 104 and relieve the burden of the node 106 where the anonymization module 108 is located, so that the volume of traffic passing through the node 106 with the anonymization module 108 is reduced. The network node 1002 with the storage module 1004 is an intermediate repository for data being exchanged by the client with the server.

Figure 11:
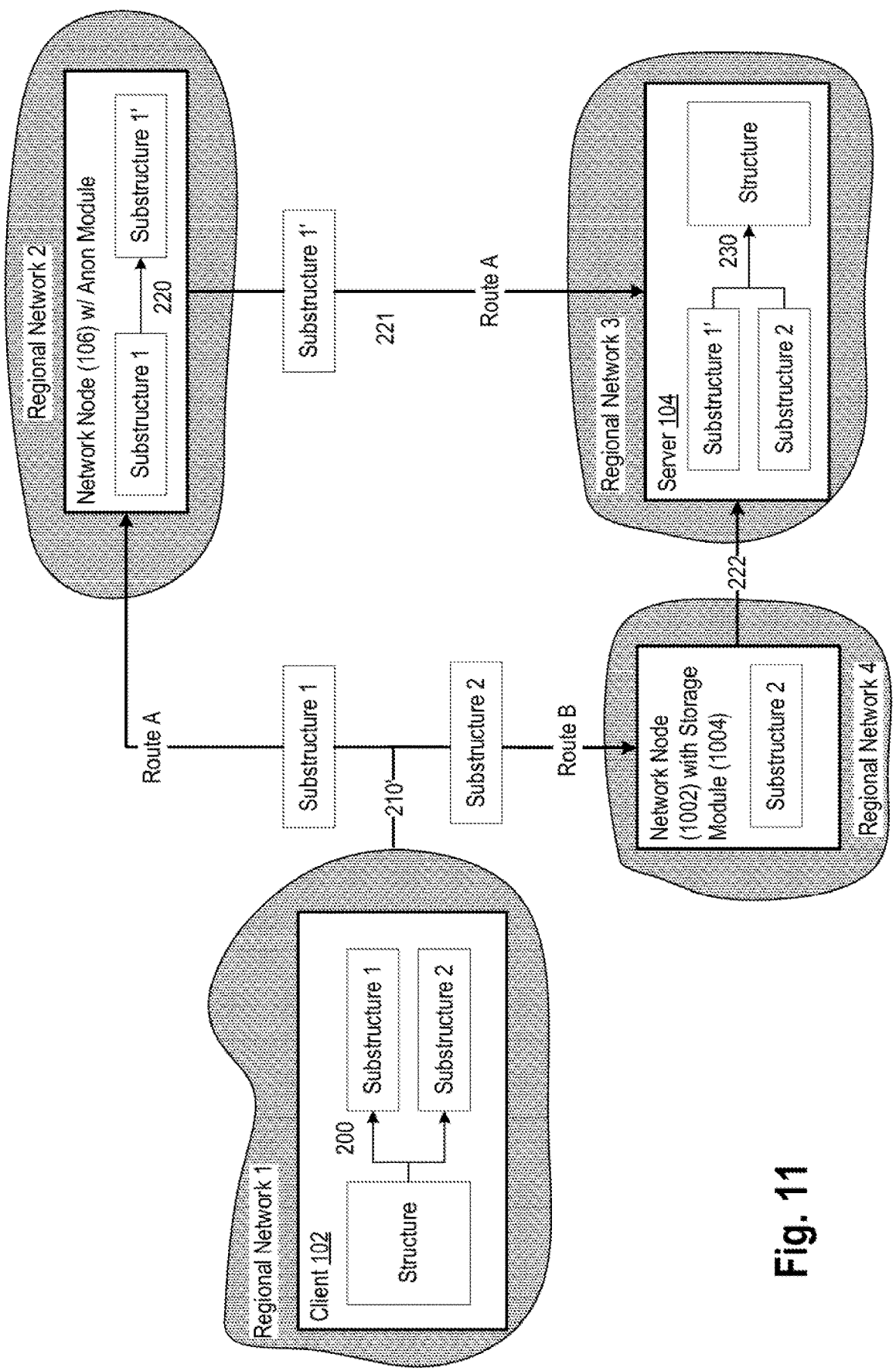
FIG. 11—illustrates a variant of a method of data exchange in a client-server architecture, which is used to obtain data from clients for constructing statistics on the server side.

The system 1000 shown in FIG. 10 is used for the anonymous exchange of data between a client and a server, including for the transmission of data from clients which are used to construct statistics and for client-server interaction of the "request-response" type. FIG. 11 shows the method of anonymous exchange of data between a client and a server, which in a particular instance is used to obtain data from clients for the construction of statistics on the server side. The steps 200, 221, 220, 230 are analogous to the steps shown in FIG. 2. Step 210' differs from the analogous one and step 222 is added. In FIG. 2 route B went directly from client to server, but in the aspect being described in FIG. 11 this route is broken up, and the client dispatches Substructure 2 not to the server, but to the node with the storage module 1004. Then, in step 222 this substructure will be received by the server. The initiator of the transmission of this substructure to the server in step 222 may be either the node 1002 with the storage module 1004 or the server 104, which downloads the Substructure 2 on demand when it receives via route A the Substructure 1' with the identifier of Substructure 2 that was saved by the network node 1002 with storage module 1004.

Figure 12:
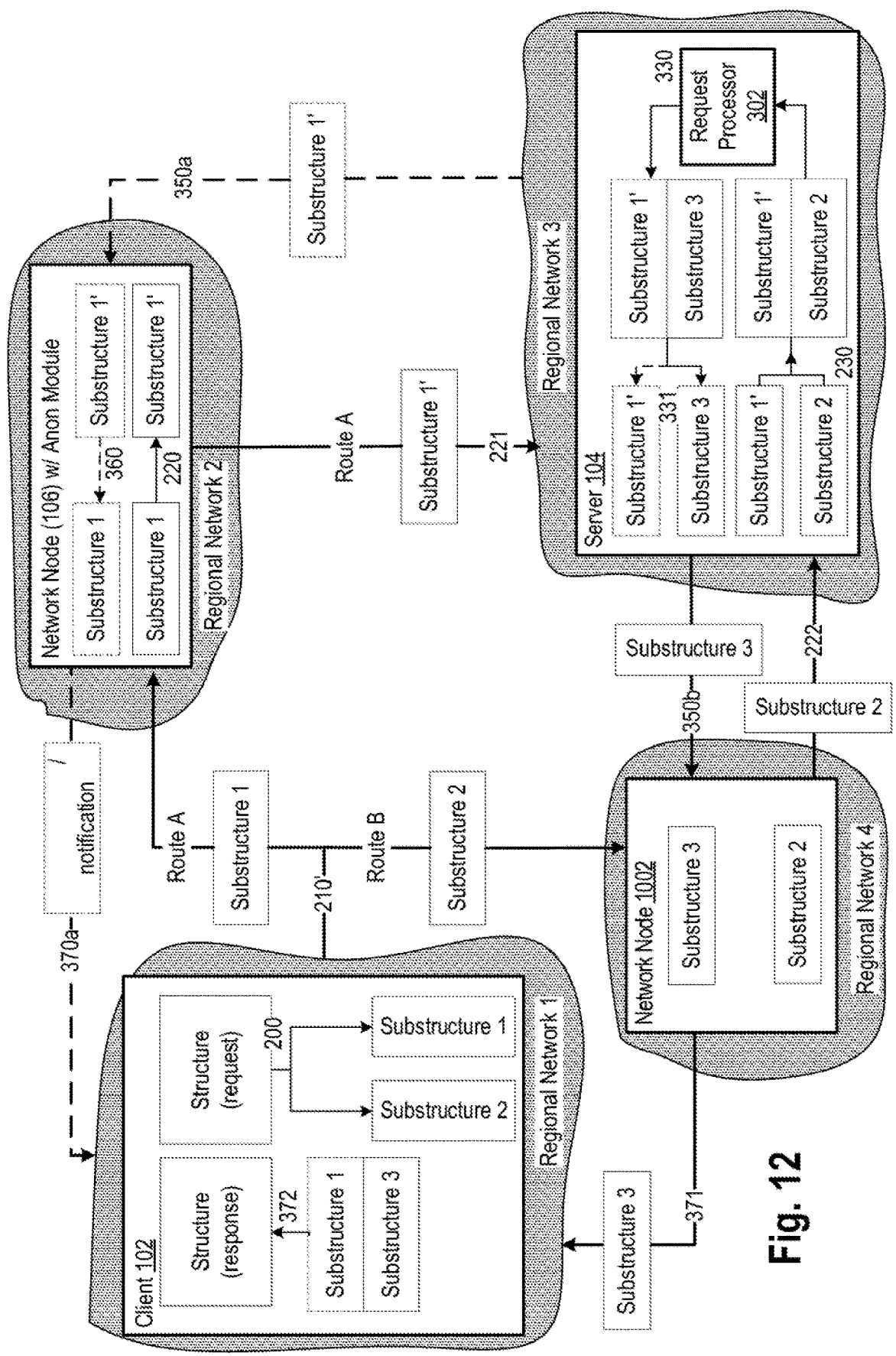
FIG. 12—illustrates a variant method of data exchange, which is used when executing a request of the client to the server.

FIG. 12 shows a method of data exchange which is used in a particular instance for executing a request of a client to the server. The steps 200, 221, 220, 230 are analogous to the steps shown in FIG. 2, the steps 210', 222 are analogous to the steps shown in FIG. 11, the step 330 is analogous to this same step in FIG. 3. Thus, the dispatching of a request to the server is analogous to the dispatching of data to the server for the construction of statistics, as shown in FIG. 11; the distinctions from all that was described above include how the response, prepared in step 330, is dispatched. The structure of the response to the request, generated in step 330, is broken up into at least two substructures in step 331: (1) at least one substructure containing PD transformed by the anonymization module 108 (e.g., Substructure 1', extracted from the request structure); and (2) at least one substructure not containing PD (substructure 3, containing the body of the response to the request or the payload of the response).

In step 350a the substructure containing PD is dispatched from the server 104 to the 106 node with the anonymization module 108, where in step 360 a transformation will be performed which is the inverse of the transformation performed in step 220. The substructure not containing PD (in FIG. 12 Substructure 3) is dispatched in step 350b to the network node 1002 with the storage module 1004. Next, the substructure not containing PD will be sent to the client in step 371. Variants whereby the client receives the substructure in step 371 may be different. If step 350a is carried out, then after the transformation in step 360 the node with the anonymization module 108 will dispatch a notification (message) to the client in step 370a that the response is ready; after this, the client accesses the node with the storage module 1004 and receives the substructure not containing PD from the node with the storage module 1004. The notification in step 370a may contain, for example, a unique identifier assigned to the Substructure 3 in the process of dividing the structure of the response to the request in step 331, the substructure with this identifier being requested by the client from the network node 1002 with the storage module 1004. In a particular instance, steps 350a, 360, 370a might not be performed. In this case, the identifier assigned to the substructures in the process of division in step 200 will be analogous to the identifier assigned in step 331 and the client in step 371 will obtain the Substructure 3 by periodically polling the node with the storage module 1004 as to the arrival there of the substructure with the corresponding identifier. If steps 350a, 360, 370a are not performed, the structure of the response to the request is identical to the substructure not containing PD (substructure 3), to which a unique identifier is assigned. In another particular instance, the node with the storage module 1004 independently dispatches the Substructure 3 to the client in step 371; in this case, the session identifier is used, which was established between the client and the node with the storage module 1004 to carry out step 210; in the given case, the unique identifiers assigned to the substructures in steps 200 and 331 are equal and they are equal to the session identifier. In this case, when the node receives the Substructure 3 in step 350b, it will read the identifier of Substructure 3 and forward it to the client whose session has the same identifier; the primary condition for the performance of this variant is the maintaining of the session between client and node with the storage module 1004 until the end of the data exchange between the client and the server when executing the request and dispatching the response.

Figure 12A:
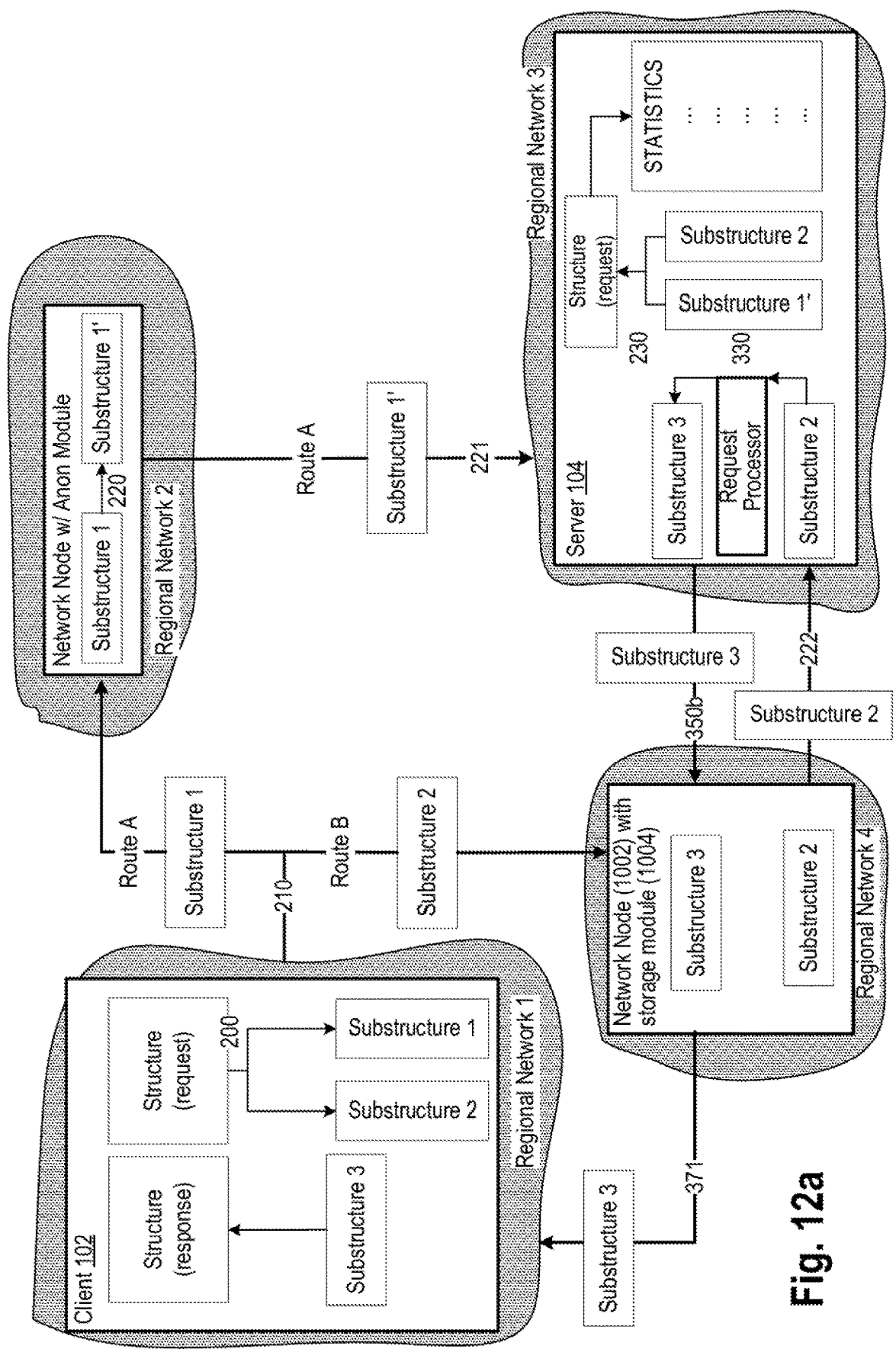
FIG. 12A—illustrates a variant of the method of data exchange, which is used when executing a request of the client to the server, and includes a combining of substructures.

In a particular instance, the scheme described in FIG. 12 may operate in an asynchronous mode; in this case, step 330 is carried out without performing step 230, the data of Substructure 2 is used, and the obtained Substructure 3, omitting step 331, is dispatched to the node with the storage module 1004 (step 350b). Step 230 will be performed independently of step 330. Such a mode increases the speed of the server's reaction and is used in the event that only the data contained in the substructure not containing CD is needed for the processing of the request. A combining of the substructures (step 230) in such cases is only necessary to construct statistics, as in the example shown in FIG. 12a.

Figure 13:
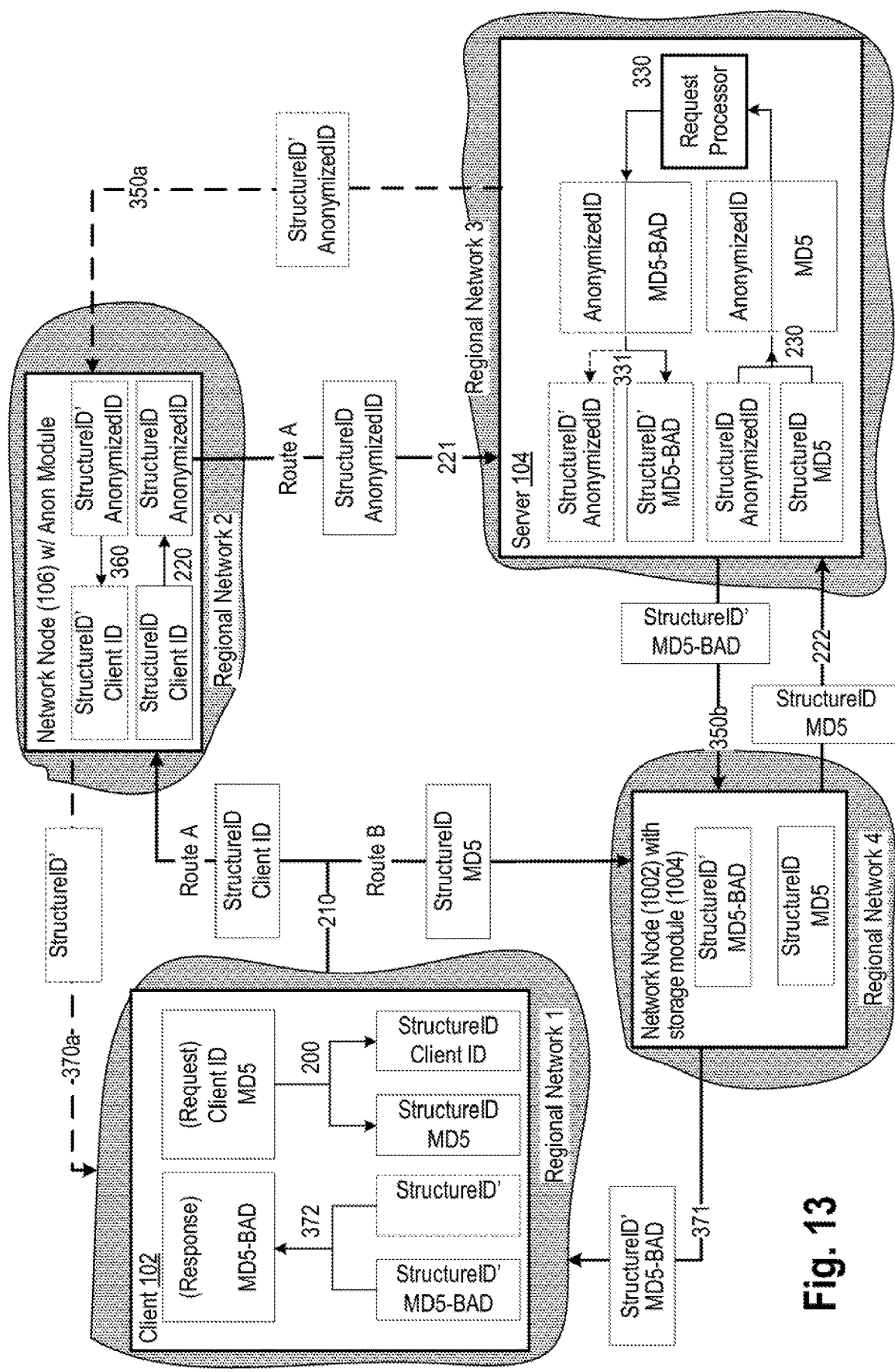
FIG. 13—illustrates an exemplary aspect of the method of data exchange, when executing a request of the client to the server.
Figure 13A:
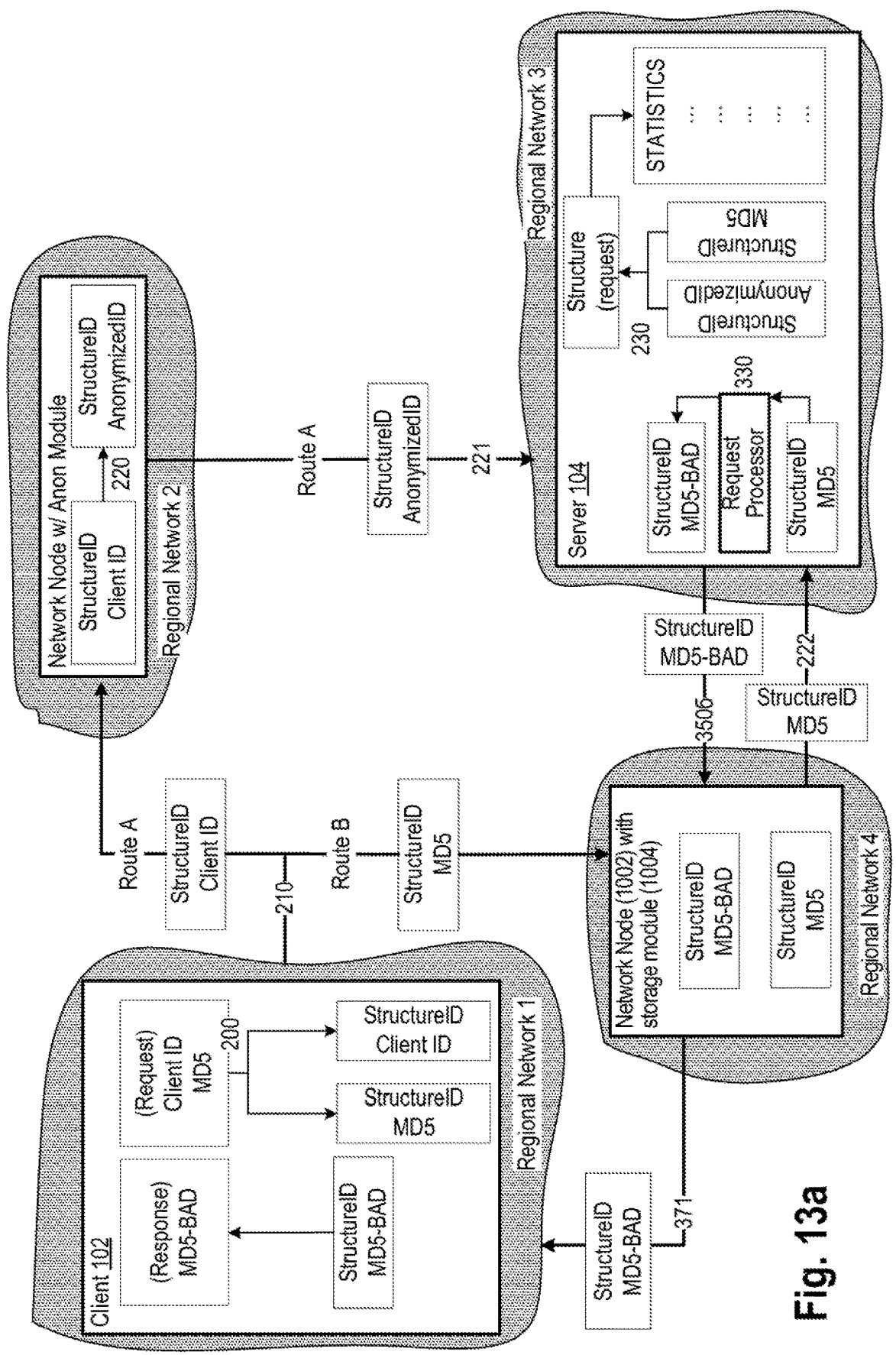
FIG. 13a—illustrates an exemplary aspect of the method of data exchange, when executing a request of the client to the server in asynchronous mode.

FIG. 13 shows an example of the use of the method illustrated in FIG. 12 in order to obtain a verdict (dangerous/malicious or safe) for a file detected on the client side from the server. For the transmission to the server of information about the detected file (in the present example, the information about the file is the MD5 of the file), a data structure is generated which includes the client ID and the MD5 of the detected file. In step 200 the modification module 110 divides the generated structure, intended for transmission to the server, into substructures, obtaining as a result of the division a substructure containing the client ID and a substructure containing the MD5 of the file; in order to know the structure to which the substructures pertain, they are assigned an identifier (in the figure the identifier is denoted as StructureID). In step 210 the modification module 110 of the client dispatches the obtained substructures. The dispatching is done by different routes (route A and route B) and to different recipients. By route A the substructure is dispatched to the server, route A including the network node with the anonymization module 108, said node being situated in a regional network different from the network where the server is located, and not being in the same intranet as the server or the client. The substructure containing the client ID is sent to the server via the node with the anonymization module 108 (route A). By route B the substructure is dispatched to the network node 1002 with the storage module 1004, said node being situated in a regional network different from the network where the server is located, and not being in the same intranet as the server or the client. The substructure containing the MD5 of the file is sent to the network node 1002 with the storage module 1004 (route B). In step 220 the anonymization module 108 is used to perform a transformation of the client ID, where the client ID is saved at the node, and it replaces this in the substructure with the token AnonymizedID (in a particular instance, the client ID may be encrypted). The obtained substructure is dispatched to the server (step 221). In step 222 the substructure with the MD5 of the file will be received by the server. If the method is carried out in synchronous mode, then in step 230 the substructures obtained by the server in step 221 and step 222 will be combined and the response will be processed in step 330. In the example, MD5 will be scanned by a database of malicious and safe files and the results of the scan will produce a verdict and generate a response to the request (in the given example, the file proved to be malicious—MD5-BAD). The generated response to the request is divided in step 331 into two substructures, as a result of the division one obtains a substructure containing the client ID and a substructure containing the verdict (MD5), in order to know the structure to which the substructures pertain, they are assigned an identifier (denoted in the figure as StructureID); in a particular instance, the identifier may be identical to the identifier assigned to the substructures in step 200. In step 350b the substructure with the verdict is dispatched to the network node 1002 with the storage module 1004, which either forwards the substructure to the client in step 371 (if StructureID corresponds to the session ID between the node and the client established in step 210), or saves until needed. This substructure may be needed by the client in the event of it receiving a notification from the node with the received anonymization module 108 of the clients as a result of the execution of steps 350a, 360,

370*a*. In another aspect, the client may constantly poll the network node 1002 with the storage module 1004 as to the presence of the response substructure at the node (in this case, the StructureID assigned to the substructures in steps 200 and 331 should be identical). In step 372 the client processes the response. If the method is carried out in asynchronous mode (FIG. 13*a*), then step 230 and step 330 are performed independently. The StructureID in step 330 does not change and is identical to the StructureID in step 200, and in a particular instance is equal to the session ID between the client and the node with the storage module 1004 of step 210, in which context a transmission of the substructure will also take place in step 371.

Aspects of the present disclosure make it possible to decentralize the data coming from a client, which provides anonymity for the user whose device is the client; the data being exchanged by the client with the server cannot be associated with the client upon accessing the server. Some of the data is known only to the server, some only to the network node with the anonymization module 108, and the data cannot be de-anonymized without simultaneous access to these system components, while the impossibility of simultaneous access to the components, including by government structures, is assured by distributing the system components among different regional networks, differing both in geographical respect and in respect of territorial jurisdiction. Aspects of present disclosure, when utilizing a node with a storage module 1004, also allow the external IP address of the client to be hidden from the server (the server does not pick up the substructure directly from the client, but instead via the node with the storage module 1004), and also reduces the burden on the node with the anonymization module 108.

In certain cases, after the data structure has been divided into two data substructures, one of which contains confidential data, it becomes necessary to further divide the given substructure. This is done, in one particular instance, when the data are critical only when found together, e.g., the IP address and the time stamp are together personal data; having divided the substructure in which this linkage is found into a substructure with the IP address and a substructure with the time stamp, the data lose their personal attribute and may be processed by the node, not having the ability to combine these structures, with no restrictions placed by legislation on the processing of critical (in the given case, personal) data. But in such a case the mechanism of sending the data to the server is more complex.

Figure 14:
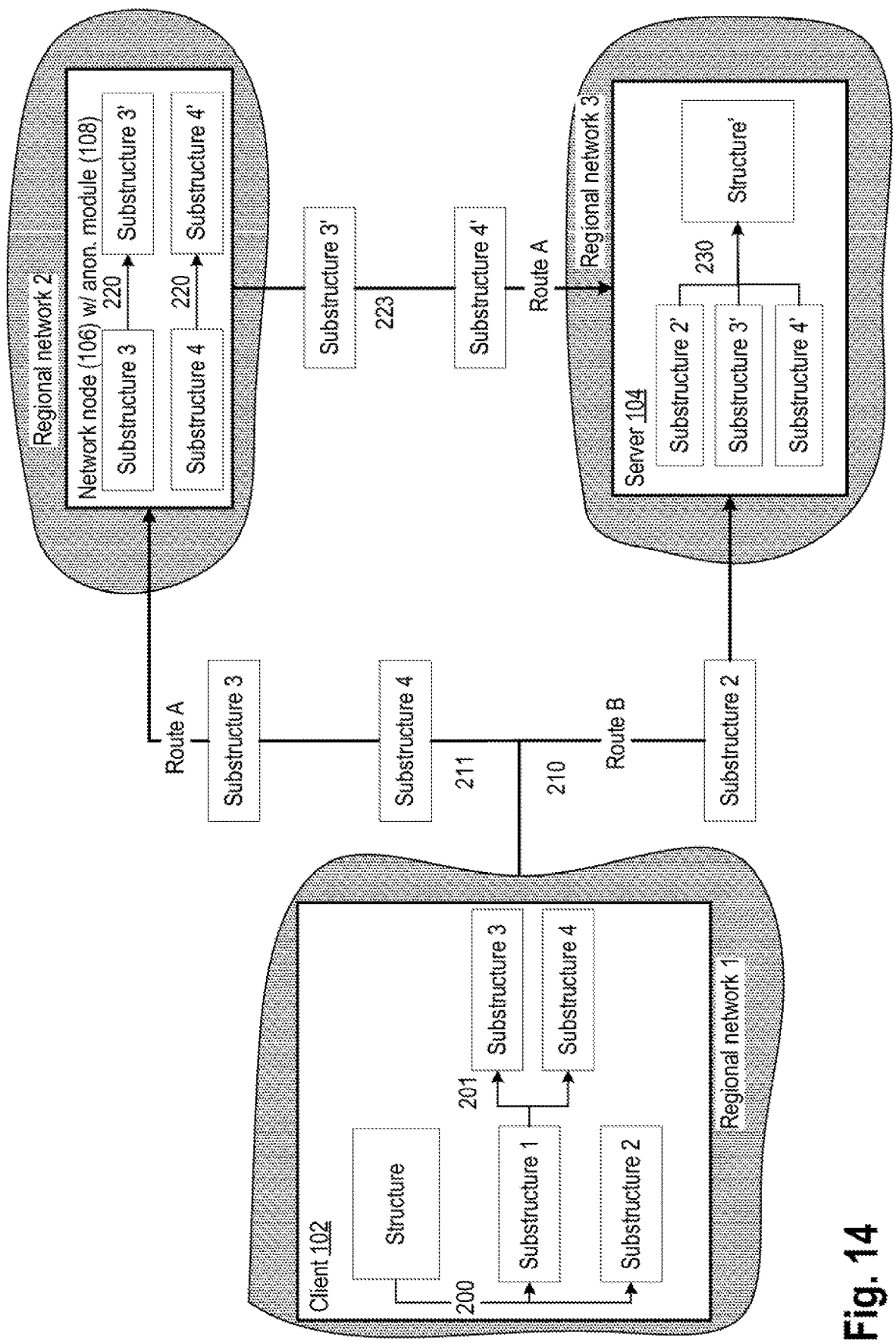
FIG. 14—illustrates a variant method of sending critical data in a client-server architecture.

FIG. 14 shows a method of transmitting critical data in a client-server architecture which is used in a particular instance for obtaining data from clients for the construction of statistics. It is understood that certain individual infrastructure elements (e.g., the request processor, the attack detecting module, database) indicated in other figures are omitted from FIG. 14 for clarity purposes only.

In step 200, the modification module 110 (e.g., executing on the client device 102) divides the structure intended for transmitting to the server 104 in accordance with criteria, one such criterion may be the presence of critical (e.g., confidential, personal) data in the structure. As a result of the division, there are obtained a first data substructure containing critical data (this being substructure 1 for the example in FIG. 14) and a second data substructure not containing such data (this being substructure 2, correspondingly, in FIG. 14). In step 201, the modification module 110 additionally divides the substructure containing critical data into at least two substructures (this being substructure 3 and substructure 4 for the example in FIG. 14). In step 210, the modification module 110 sends substructure 2 to the server by route B. In step 211, the substructures obtained during the dividing of the substructure containing critical data are sent in succession by another route, different from route B, where the alternative route includes a network node with a transformation module (this is route A in the example of FIG. 14), and being located in a particular instance in a regional network different from the network where the server is located and not being in the same intranet with the server or the client.

Next, in step 220 the substructures passing through the node 106 with the transformation module are transformed by that module and sent onward to the server (step 223) in transformed state. In the general case, the substructures from the same client can be transformed differently at different moments of time (for example, Client ID→AnonymizedID1≠AnonymizedID2≠AnonymizedID3 and so forth). This applies to all examples, but in a particular instance the transformation will be identical (e.g., Client ID→AnonymizedID1=AnonymizedID2=AnonymizedID3 and so forth) when for certain security systems it is necessary to gather information (construct statistics) on a particular client for a substructure from the same client. Finally, in step 230, the substructures obtained from the client are combined into a data structure (Structure'). The final data structure (Structure') is clearly different from the original one, since at least two substructures have been transformed by the anonymization module 108. The final structure in the database will also be used by the infrastructure module on the server side, for example to construct a profile. The transformation of the substructures and/or the data of the substructures by the transformation module is done by a method precluding the possibility of an inverse transformation of the substructures and/or the data of the substructures by any modules other than the modules of the network node with the transformation module.

Figure 14A:
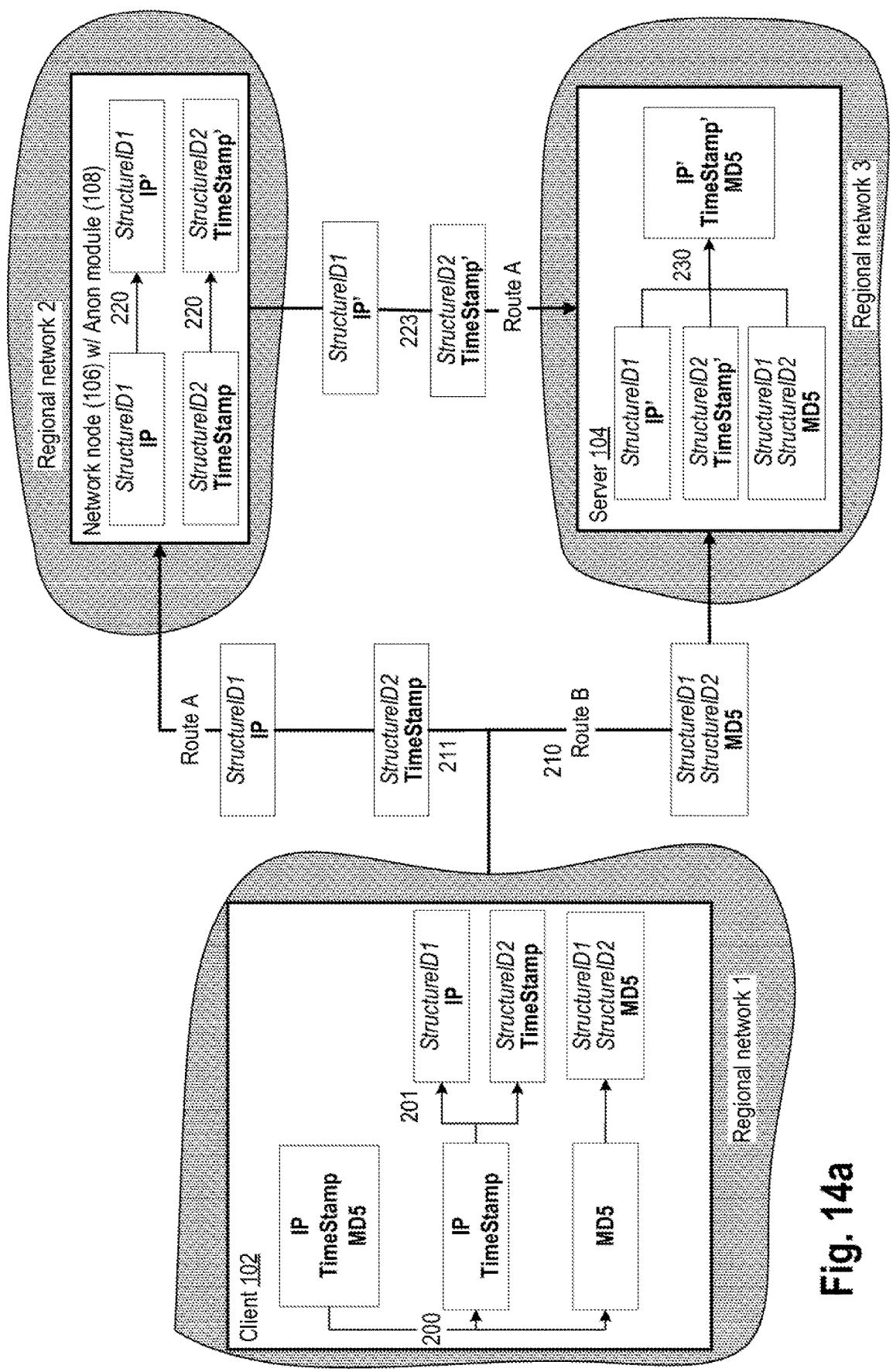
FIG. 14A—illustrates an exemplary aspect of the method of sending critical data in a client-server architecture.

FIG. 14*a* shows an example of the implementation of a method of transmitting critical data. On the client side, a structure is generated for sending to a server, the structure contains the IP address of the client, a time stamp (TimeStamp) and the MD5 of a certain file. In step 200, the modification module 110 divides the structure intended for sending to the server, as a result of the dividing there are obtained: a substructure containing the IP address and the time stamp, and a substructure containing the MD5 of the file. In step 201, the modification module 110 further divides the substructure containing the IP address and the time stamp into two substructures (in FIG. 14*a* this is the substructure with the IP address and the substructure with the time stamp). In order to know which substructure containing the MD5 is related to the IP substructure and the TimeStamp substructure, they are assigned identifiers (in the figure, the identifiers are denoted as StructureID1, StructureID2) and these same identifiers are placed in the MD5 substructure. In step 210, the modification module sends the substructure with the MD5 to the server by route B, and in step 211 it sends consecutively the substructure with the IP address and the substructure with the time stamp by another route, different from route B, where the alternative route includes a network node 106 with a transformation module 108 (in the example of FIG. 14*a* this is route A), where the node with the transformation module is located in a particular instance in a regional network different from the network in which the server is located, and not being in the same intranet as the server or the client. Then, in step 220, the substructure with the IP address and the substructure with the time stamp are transformed and sent onward to the server (step 223) in transformed form. The transformation is done as the substructures are received. At the conclusion, in step 230, the substructures received from the client are combined into a structure containing the transformed IP address, the transformed time stamp, and the MD5.

Figure 1A:
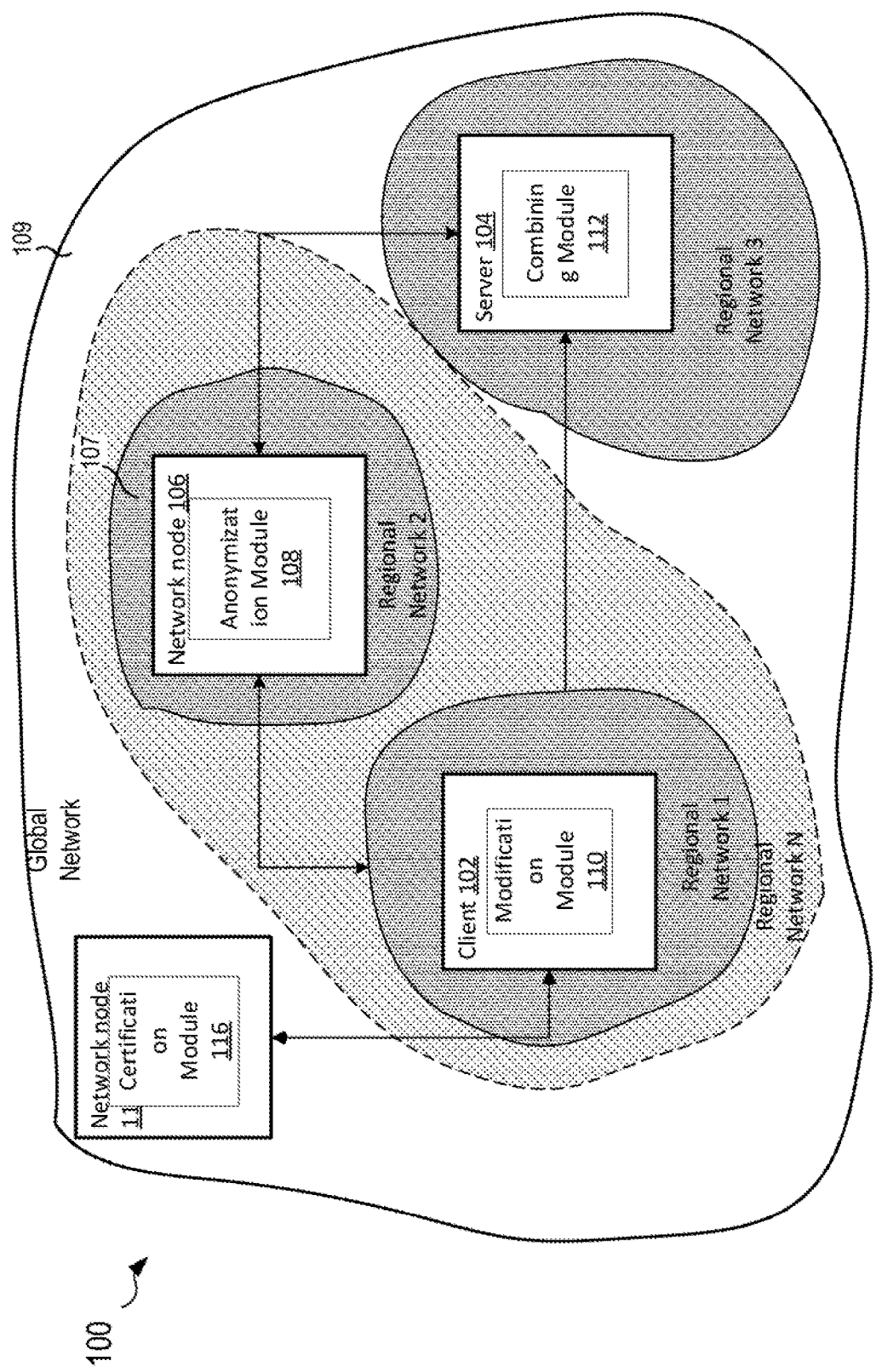
FIG. 1a—illustrates a system for data routing in a client-server architecture, which includes a certification module.

FIG. 1 illustrates a system for data routing in a client-server architecture. FIG. 1A shows the same system, only in this system there is an additional network node 114 with a certification module 116. In this system, as well as in the system in FIG. 10, a storage module may be present. The certification module 116 may be used to generate encryption keys for the primary transformation of confidential data on a plurality of the clients 102. In an aspect, if an asymmetric encryption scheme is used for transformation (described below), then an independent, trusted certification module 116 is used to create a key pair for each client 102, consisting of a public key and a private key. In an aspect, the certification module 116 is configured to transfer the public key to the client 102 and configured to keep the private key. The disclosed anonymization method uses encryption of identifiers transmitted by the user's device (client) 102 using a public key generated by a trusted certification module 116. This procedure guarantees that no one on the node with an anonymization module 108 and server 104 will be able to find out the real identifiers of users of client 102. Real user identifiers are not accessible without the private part of the key, which is kept by the certification module 116 and not disclosed to anyone. In an aspect, the network node 114 hosting the certification module 116 may be located on a different intranet from the client 102, server 104, and anonymization module 108. In a particular case, this node 114 is located in a regional network different from the regional network of the server 104 and/or the regional network of the node 106 with the anonymization module 108 and/or the client 102. In yet another aspect, the network node 114 and/or its certification module 116, may be operated by an independent and trusted certification authority, which is not part of or under the control of the operators of the anonymization module 108 and/or server 104.

Figure 16:
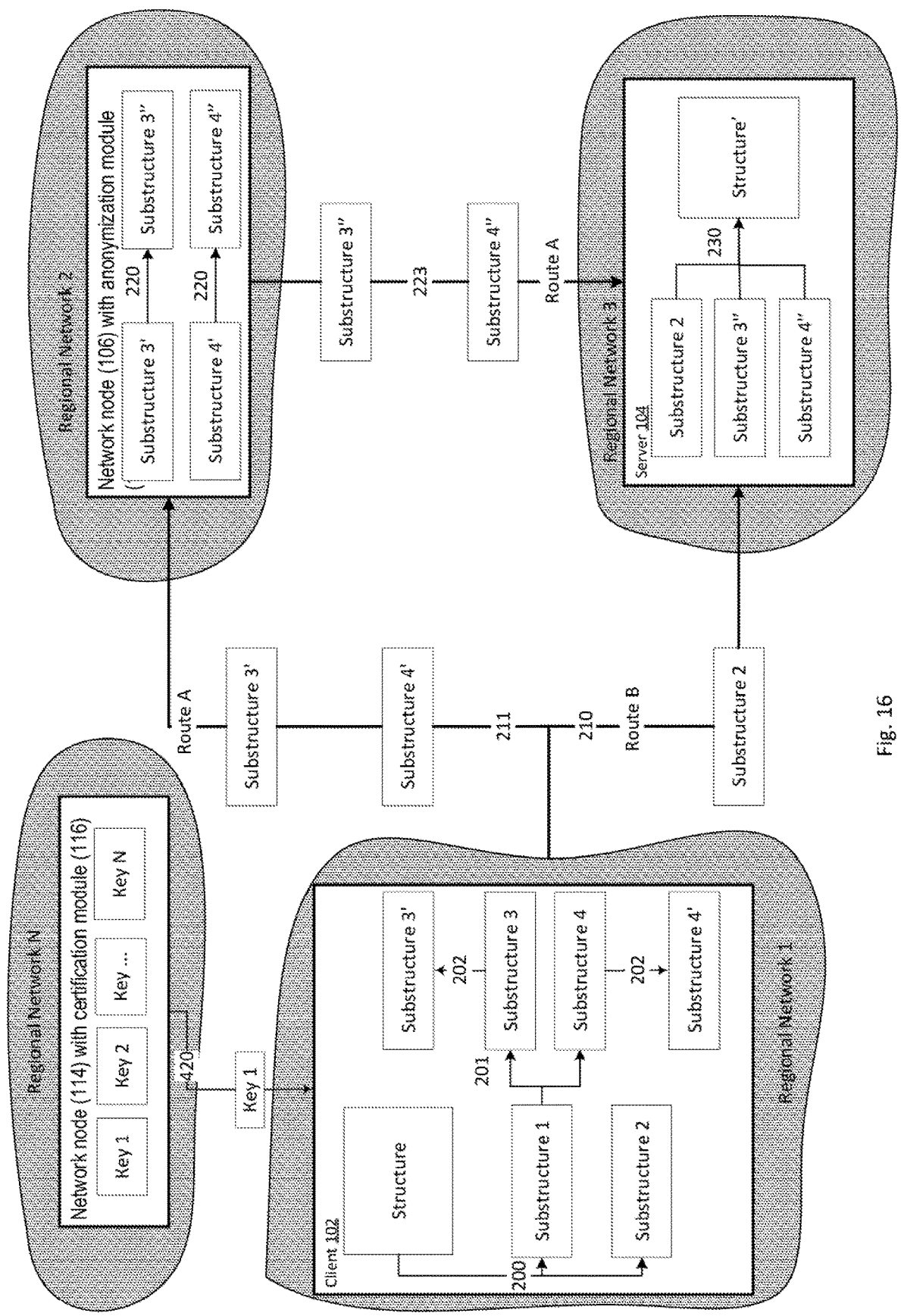
FIG. 16—illustrates a variant method of sending critical data in a client-server architecture using a certification module.

FIG. 16 illustrates an exemplary method for transferring critical data in a client-server architecture using a certification module 116. At step 410 (not shown in the figure), encryption keys are generated by the certification module 116. Next, at step 420, the certification module 116 transmits the public encryption key to the client 102. Further, the client 102 uses the received key for the initial data encryption. For example, the client my encrypt confidential data sent from the client 102, such as, but not limited to, identifiers, IP addresses, email addresses, links to social network profiles, timestamps, phone numbers, etc. At step 200, the client's modification module 110 separates the structure intended to be sent to the server 104 in accordance with a predefined criteria. One such criteria may be the presence of critical data in the structure. A particular case of critical data is confidential data (sensitive data) or personal data. As a result of this modification, the original structure may be divided into a substructure containing critical data (for example, substructure 1 in FIG. 16) and a substructure not containing such data (substructure 2 in FIG. 16). At step 201, which is optional, the modification module 110 may further divide the substructure containing critical data into at least two substructures that contain different types of critical data (these are substructures 3 and 4 in FIG. 16, for example). At step 202, the modification module 110 encrypts substructures 3 and 4 using the received public key to obtain a substructure 3' and a substructure 4'.

At step 210, the modification module 110 sends substructure 2 to the server 104 via route B. At step 211, the substructure 3' and the substructure 4' obtained by splitting the substructure containing the critical data using the primary transformation and encryption are sequentially sent along an alternative route different from route B. In an aspect, the alternative route includes a network node 106 with an anonymization module 108 (route A in the example in FIG. 16). In an aspect, the alternative route is located in a regional network different from the network that hosts the server 104 and/or is not on the same Intranet with the server 104 or client 102. Next, at step 220, the substructures passing through the node 106 with the anonymization module 108 are re-transformed by the anonymization module 108 (into substructure 3" and substructure 4" in the example in FIG. 16). The anonymization module 108 transmits the received substructures further to the server 104 (step 223) in the transformed form.

In general, substructures from the same client 102 can be transformed differently at different points in time. For example, a substructure having a client identifier sent at a first time period is transformed to include an anonymized identifier (AnonymizedID1) which is different from a subsequent anonymized identifier (AnonymizedID2) from a substructure sent at a second time even if it came from the same client 102 and had the same client identifier (i.e., Client ID'→AnonymizedID1≠AnonymizedID2≠AnonymizedID3, etc.), and this may pertain to all the examples. In a particular case, when it is necessary, for certain security systems, to assemble information (construct statistics) on a particular client, the transformation will be identical for a substructure from the same client 102 (for example, Client ID'→AnonymizedID1=AnonymizedID2=AnonymizedID3 and so on). At the conclusion, at step 230, the substructures received from the client 102 are combined into a structure (Structure') by the server 104.

The final data structure (Structure') is clearly different from the original one, since at least two substructures have been transformed by the anonymization module 108. The final structure in the database will also be used by the infrastructure module on the server side, for example to construct a profile. The transformation of the substructures and/or the data of the substructures by the anonymization module 108 may be performed by a method precluding the possibility of an inverse transformation of the substructures and/or the data of the substructures by any modules other than the modules of the network node 106 with the anonymization module 108. The transformation of the substructures and/or the data of the substructures by the anonymization module 108 using an encryption key from the certification module 116 may be performed by a method precluding the possibility of an inverse transformation of the substructures and/or the data of the substructures by any modules other than the modules of the network node 106 with the anonymization module 108 or, or in an aspect, by a client 102. In another aspect, the inverse transformation is impossible by any means.

Figure 16A:
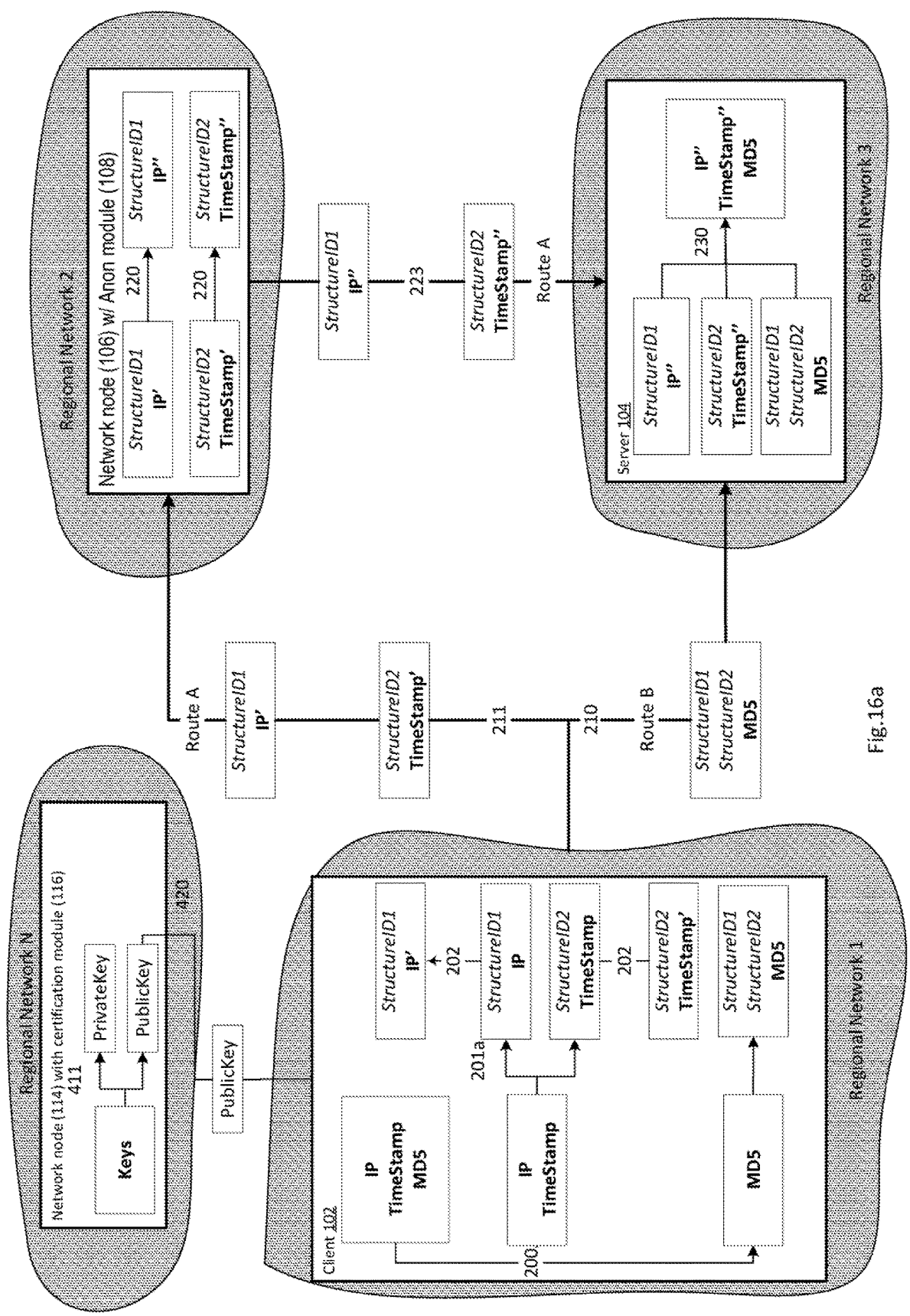
FIG. 16A—illustrates an exemplary aspect of the method of sending critical data in a client-server architecture using the certification module.

FIG. 16a illustrates another example of a method for transmitting critical data in a client-server architecture using a certification module. At step 410, the certification module 116 generates a plurality of public and private key pairs. At step 411, the certification module 116 selects a pair of public and private keys from the generated sets of keys for a particular client 102. At step 420, the certification module 116 sends the public key to the client 102 and stores the private key. The client 102 generates a structure intended to be sent to the server 104. The generated structure may contain the client's IP address, timestamp and MD5 of a detected malicious file. At step 200, the modification module 110 divides the structure intended for sending to the server 104, as a result of the dividing there are obtained: a substructure containing the IP address and the timestamp, and a substructure containing the MD5 of the file. At step 201, the modification module 110 further divides the substructure containing the IP address and the timestamp into two substructures (in FIG. 16a this is the substructure with the IP address and the substructure with the timestamp). In order to know the structure to which the substructure containing the IP address and the substructure containing the timestamp pertain, they are assigned an identifier (in the FIG. 16a the identifier is denoted as StructureID).

At step 202, the substructure data containing the IP address and the substructure data with timestamp are encrypted by the modification module 110 using the public key obtained from the certification module 116. At step 210, the modification module 110 sends the substructure with the MD5 to the server 104 via route B. At step 211, the modification module 110 sends consecutively the substructure with the IP address and the substructure with the timestamp by an alternative route, different from route B, where the alternative route includes a network node 106 with an anonymization module 108 (in the example of FIG. 16a this is route A), where the node 106 with the anonymization module 108 is located in a particular instance in a regional network different from the network in which the server 104 is located, and not being in the same intranet as the server 104 or the client 102. Then, at step 220, the substructure with the encrypted IP address and the substructure with the encrypted timestamp are transformed (e.g., anonymized) and sent onward to the server 104 (step 223) in transformed form. The transformation is done as the substructures are received. At the conclusion, at step 230, the substructures received from the client 102 are combined into a structure containing the transformed encrypted IP address, the transformed encrypted timestamp, and the MD5.

By the certification module, modification module, the anonymization module, the combining module, the request processor, the attack detection module, and the storage module are meant in the present disclosure real-world devices, systems, components, groups of components, realized with the use of hardware such as integrated microcircuits (application-specific integrated circuit, ASIC) or a field-programmable gate array (FPGA) or for example in the form of a combination of software and hardware, such as a microprocessor system and a set of program instructions, and also on the basis of neuromorphic chips (neurosynaptic chips). The functionality of said means may be realized solely by hardware, and also in the form of a combination, where some of the functionality is realized by software and some by hardware. In certain variant aspects the modules may be executed on the processor of a computer (such as the one shown in FIG. 16). The databases may be realized by every possible method and may be contained either on a single physical medium or on different ones, both local and remote.

Figure 17:
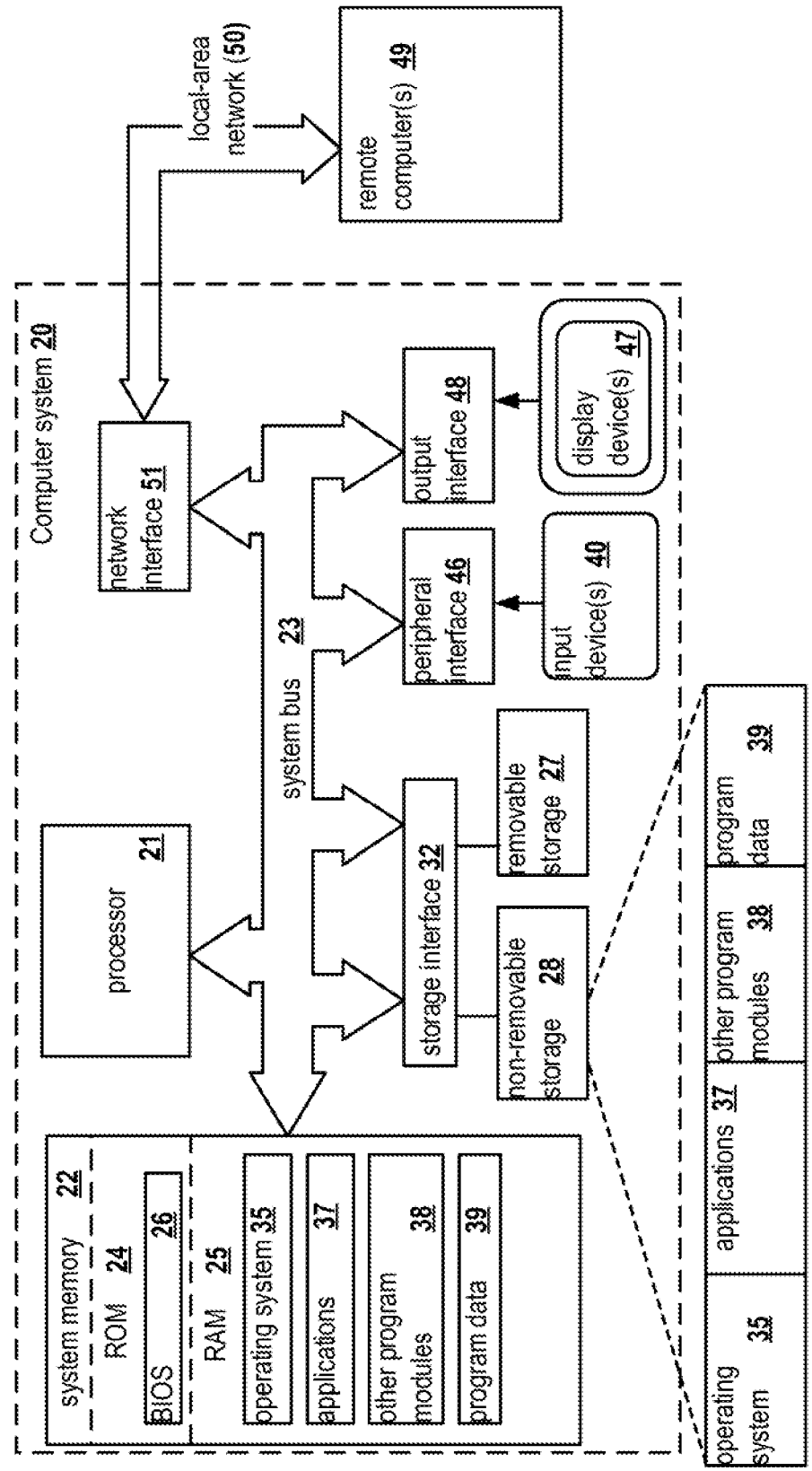
FIG. 17—illustrates an example of a computer system on which the disclosed system and method can be implemented according to an exemplary aspect.

FIG. 17 is a block diagram illustrating a computer system 20 on which aspects of systems and methods for anonymously collecting malware-related data from client devices may be implemented. It should be noted that the computer system 20 can correspond to the client 102, server 104, network nodes 106 and 1002, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I$^2$C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 17, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for anonymously collecting malware-related data from client devices, the method comprising:
   receiving, by a network node, a first data structure from a client device, wherein the first data structure contain an identifier of the client device and an encrypted data that includes an identifier of a user of the client device and/or personal data of the user, and wherein the encrypted data was encrypted by the client device with a public key of the client device, wherein the public key was provided to the client device by an independent certification authority;
   transforming, by the network node, the received first data structure by replacing the identifier of the client device with an anonymized identifier, and transmitting the transformed first data structure containing the anonymized identifier and the encrypted data to a server, wherein the anonymized identifier includes an encrypted identifier of the client device;
   receiving, by the server, the transformed first data structure from the network node;
   receiving, by the server, a second data structure from the client device, wherein the second data structure contains malware-related data obtained on the client device; and
   combining, by the server, the transformed first data structure with the second data structure and storing the combined data structure at the server, whereby the server cannot access and/or view (i) the identifier of the client device and (ii) the identifier of the user of the client device and/or personal data of the user stored in the combined data structure.

2. The method of claim 1, wherein the client device is located in a first regional network, the network node is located in a second regional network different from the first regional network, and the server is located in a third regional network different from the first and second regional networks.

3. The method of claim 2, wherein the first regional network and the third regional network are located in different legal jurisdictions.

4. The method of claim 1, wherein the malware-related data includes a hash of a malicious file.

5. The method of claim 1, wherein the network node is not located in a same intranet as the server and the client device.

6. A system for anonymously collecting malware-related data from client devices, the system comprising:
   a first network node having hardware processor configured to:
      receive a first data structure from a client device, wherein the first data structure contain an identifier of the client device and an encrypted data that includes an identifier of a user of the client device and/or personal data of the user, and wherein the encrypted data was encrypted by the client device with a public key of the client device, wherein the public key was provided to the client device by an independent certification authority;
      transform the received first data structure by replacing the identifier of the client device with an anonymized identifier, and transmitting the transformed first data structure containing the anonymized identifier and the encrypted data to a server, wherein the anonymized identifier includes an encrypted identifier of the client device; and
   a server having hardware processor configured to:
      receive the transformed first data structure from the network node;
      receive a second data structure from the client device, wherein the second data structure contains malware-related data obtained on the client device; and
      combine the transformed first data structure with the second data structure and store the combined data structure at the server, whereby the server cannot access and/or view (i) the identifier of the client device and (ii) the identifier of the user of the client device and/or personal data of the user stored in the combined data structure.

7. The system of claim 6, wherein the client device is located in a first regional network, the network node is located in a second regional network different from the first regional network, and the server is located in a third regional network different from the first and second regional networks.

8. The system of claim 7, wherein the first regional network and the third regional network are located in different legal jurisdictions.

9. The system of claim 6, wherein the malware-related data includes a hash of a malicious file.

10. The system of claim 6, wherein the network node is not located in a same intranet as the server and the client device.

11. A non-transitory computer readable medium comprising computer executable instructions for anonymously collecting malware-related data from client devices, including instructions for:
   receiving, by a network node, a first data structure from a client device, wherein the first data structure contain an identifier of the client device and an encrypted data that includes an identifier of a user of the client device and/or personal data of the user, and wherein the encrypted data was encrypted by the client device with a public key of the client device, wherein the public key was provided to the client device by an independent certification authority;
   transforming, by the network node, the received first data structure by replacing the identifier of the client device with an anonymized identifier, and transmitting the transformed first data structure containing the anonymized identifier and the encrypted data to a server, wherein the anonymized identifier includes an encrypted identifier of the client device;
   receiving, by the server, the transformed first data structure from the network node;
   receiving, by the server, a second data structure from the client device, wherein the second data structure contains malware-related data obtained on the client device; and
   combining, by the server, the transformed first data structure with the second data structure and storing the combined data structure at the server, whereby the server cannot access and/or view (i) the identifier of the client device and (ii) the identifier of the user of the client device and/or personal data of the user stored in the combined data structure.

12. The non-transitory computer readable medium of claim 11, wherein the client device is located in a first regional network, the network node is located in a second regional network different from the first regional network, and the server is located in a third regional network different from the first and second regional networks.

13. The non-transitory computer readable medium of claim 12, wherein the first regional network and the third regional network are located in different legal jurisdictions.

14. The non-transitory computer readable medium of claim 11, wherein the malware-related data includes a hash of a malicious file.

15. The non-transitory computer readable medium of claim 11, wherein the network node is not located in a same intranet as the server and the client device.

* * * * *